July 14, 1953  E. F. WHEELER  2,645,235
AUTOMATIC DOMESTIC DISHWASHER
Filed Sept. 29, 1947  15 Sheets-Sheet 1

INVENTOR.
Edwin F. Wheeler

July 14, 1953 — E. F. WHEELER — 2,645,235
AUTOMATIC DOMESTIC DISHWASHER
Filed Sept. 29, 1947 — 15 Sheets-Sheet 2

INVENTOR.
Edwin F. Wheeler

July 14, 1953  E. F. WHEELER  2,645,235
AUTOMATIC DOMESTIC DISHWASHER
Filed Sept. 29, 1947  15 Sheets-Sheet 3

INVENTOR.
Edwin F. Wheeler.

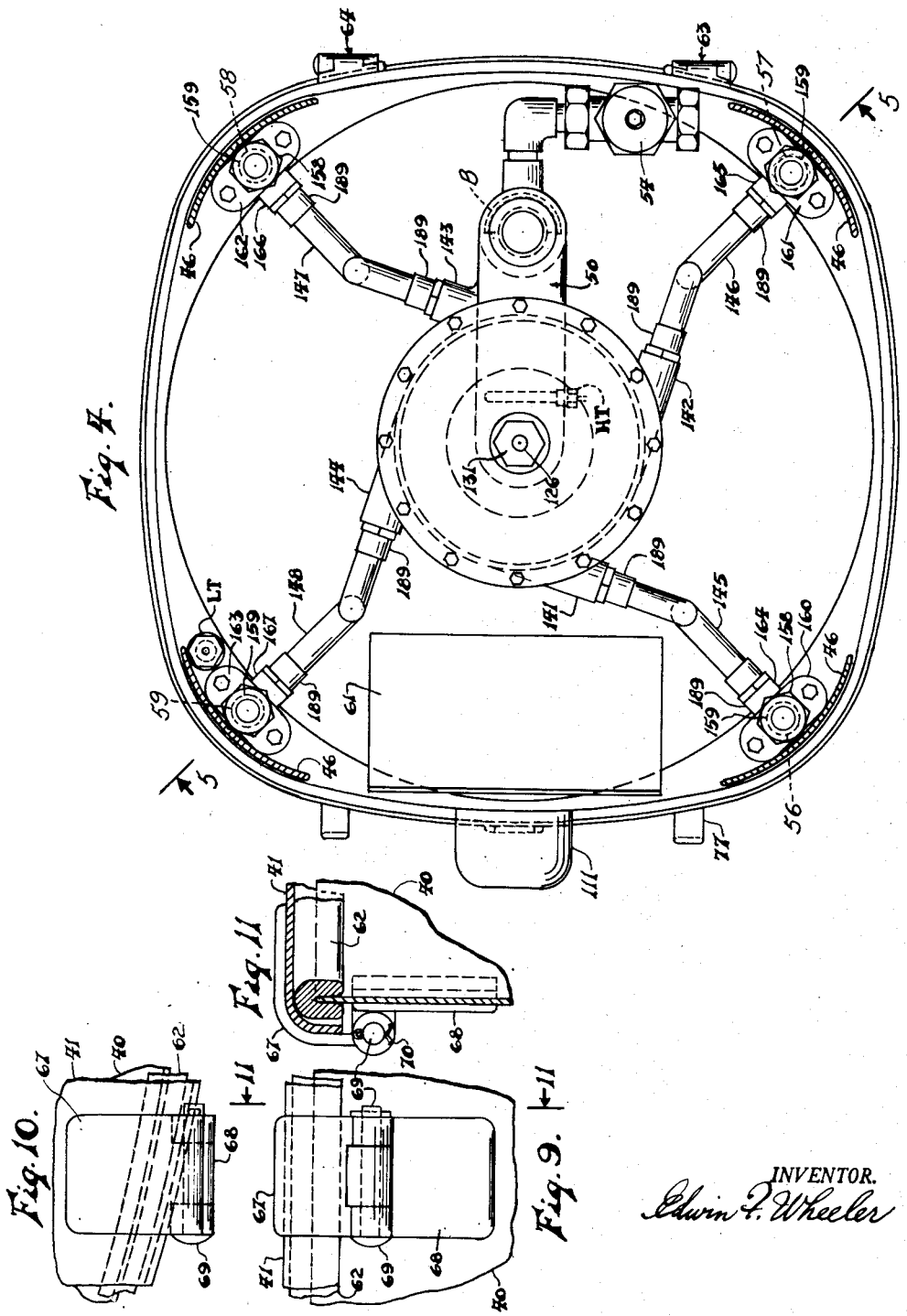

July 14, 1953  E. F. WHEELER  2,645,235
AUTOMATIC DOMESTIC DISHWASHER
Filed Sept. 29, 1947  15 Sheets-Sheet 5
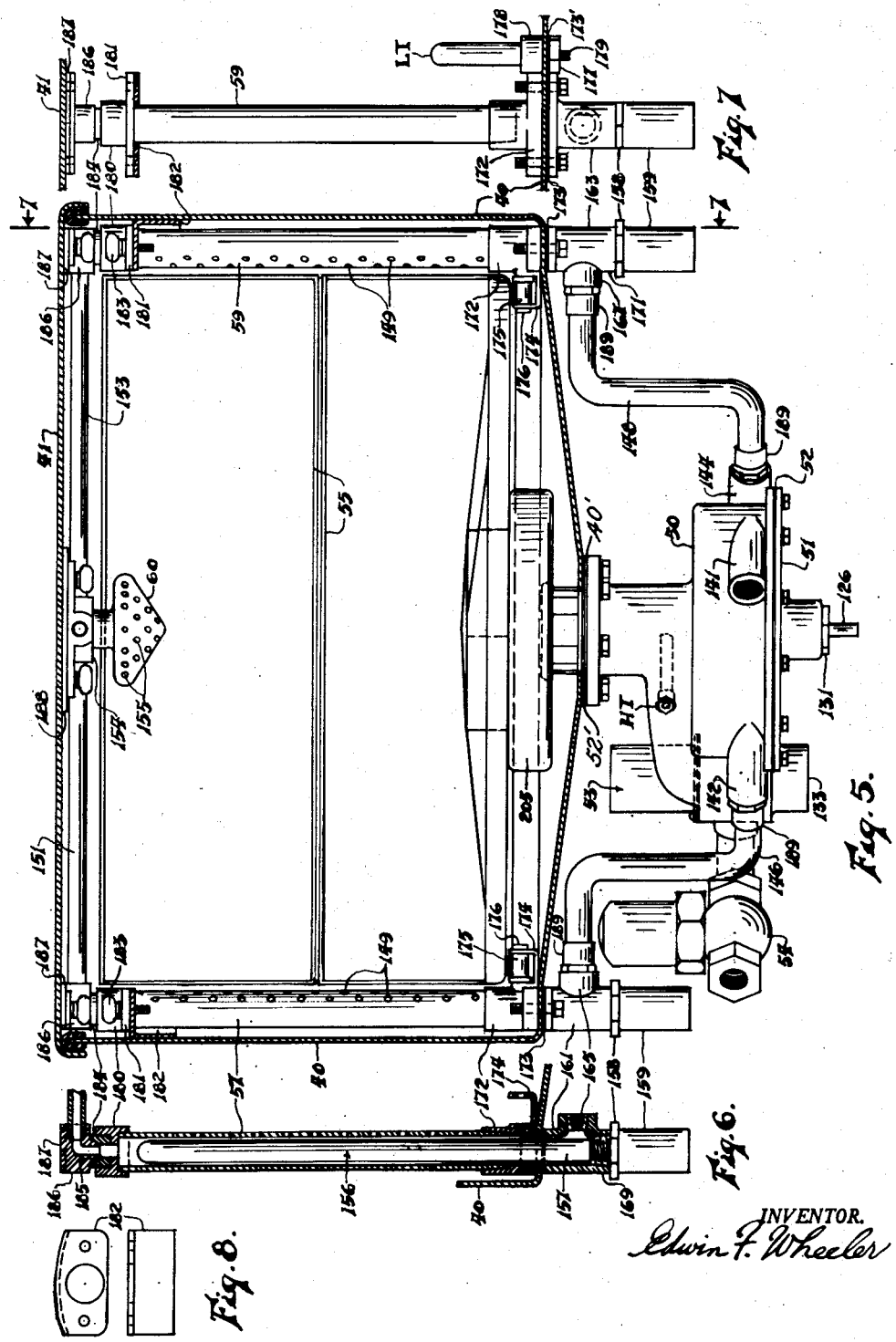
INVENTOR.
Edwin F. Wheeler

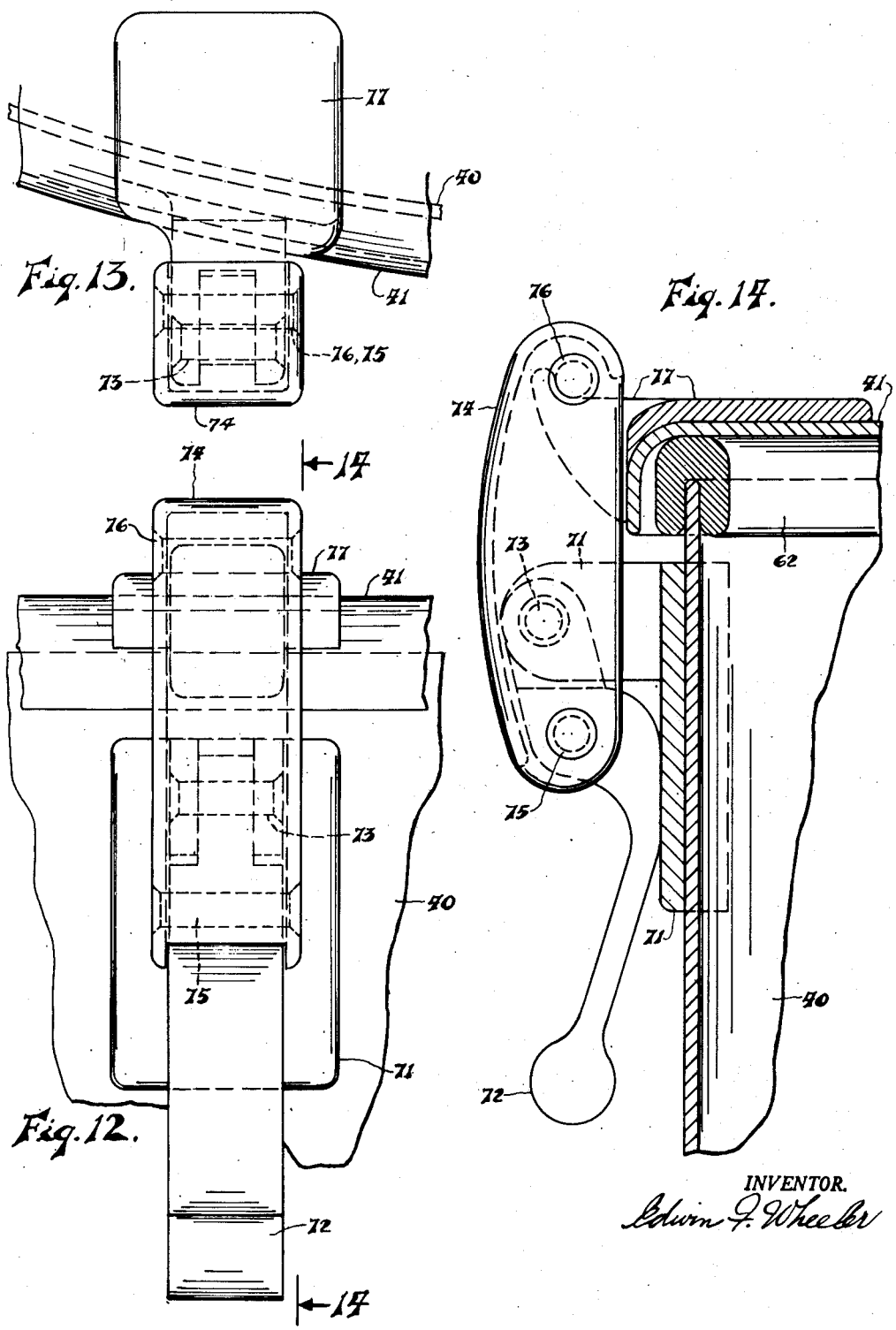

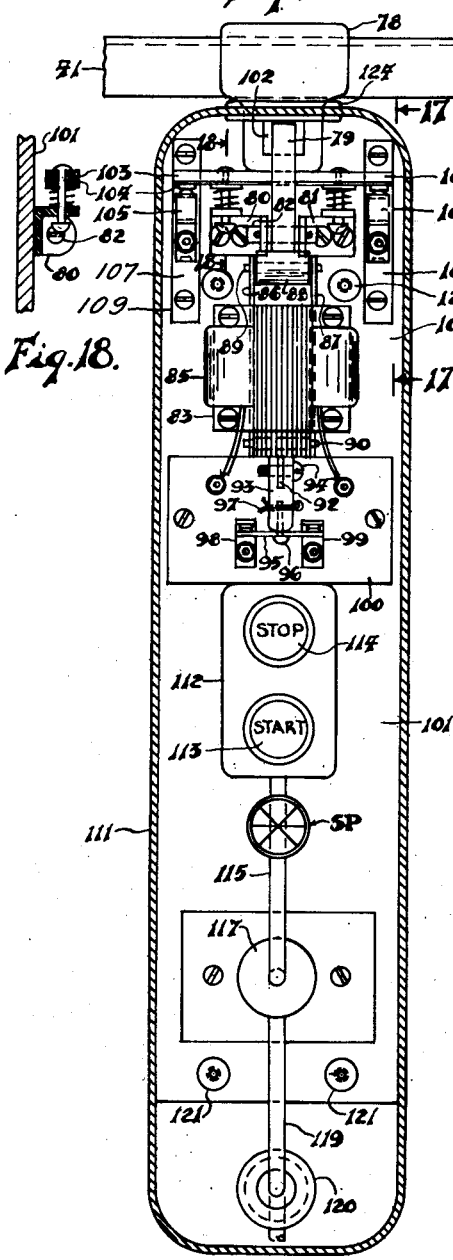

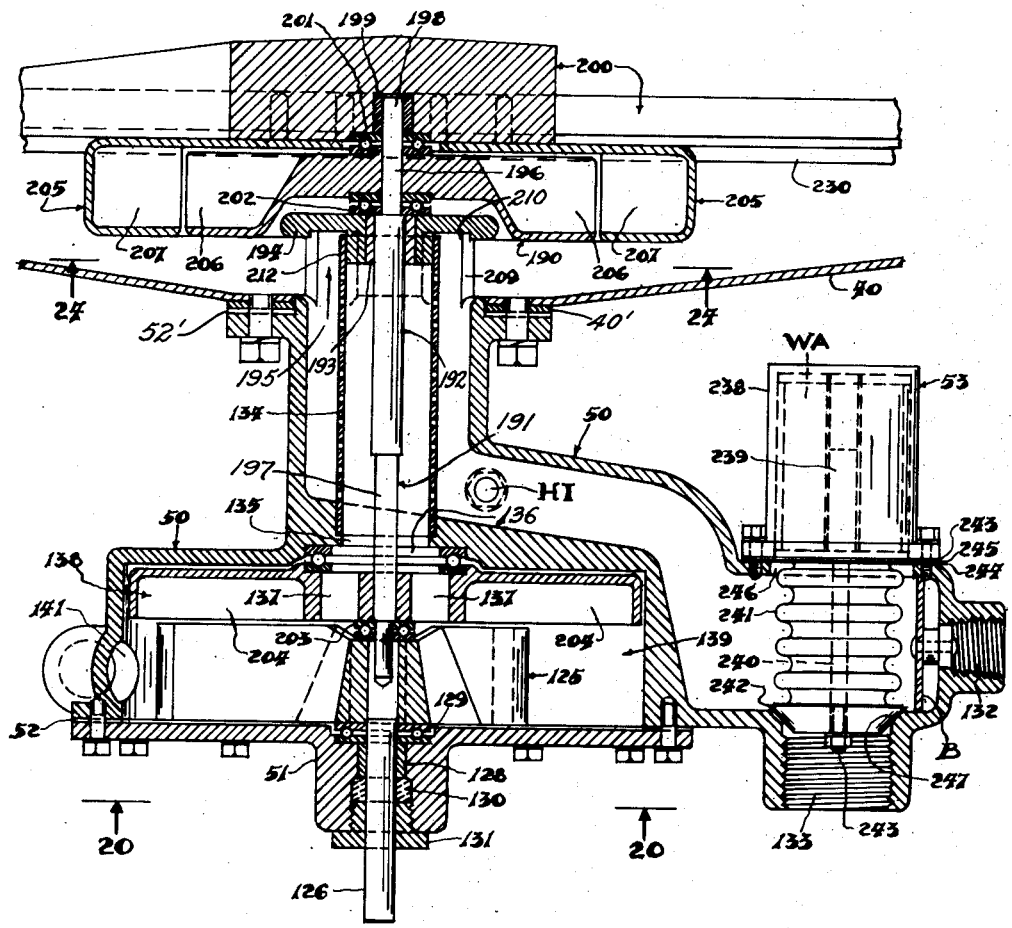

July 14, 1953  E. F. WHEELER  2,645,235
AUTOMATIC DOMESTIC DISHWASHER
Filed Sept. 29, 1947  15 Sheets-Sheet 9
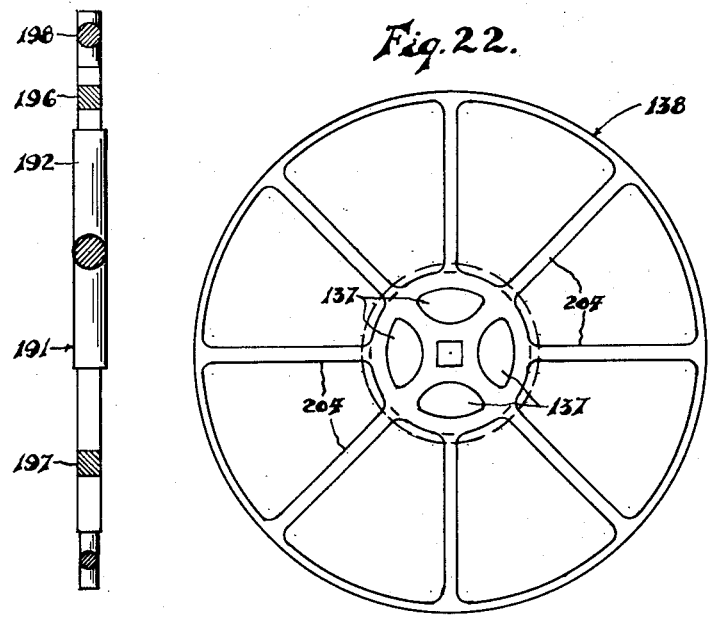
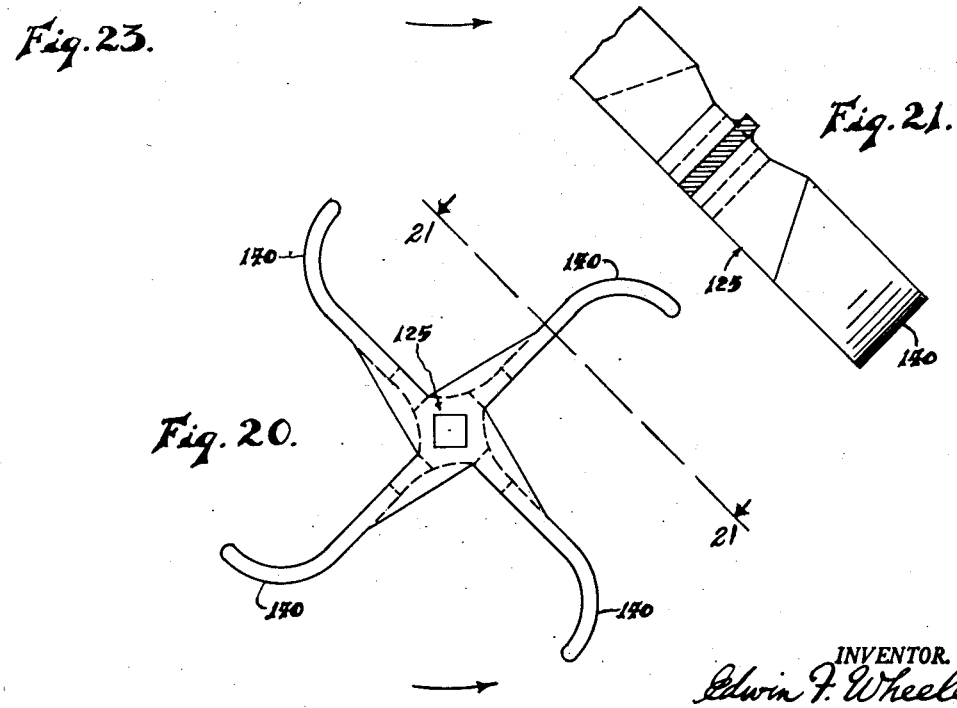
INVENTOR.
Edwin F. Wheeler July 14, 1953        E. F. WHEELER        2,645,235

AUTOMATIC DOMESTIC DISHWASHER

Filed Sept. 29, 1947        15 Sheets-Sheet 10

INVENTOR.
Edwin F. Wheeler

July 14, 1953 E. F. WHEELER 2,645,235
AUTOMATIC DOMESTIC DISHWASHER
Filed Sept. 29, 1947 15 Sheets-Sheet 11

INVENTOR.
Edwin F. Wheeler

July 14, 1953  E. F. WHEELER  2,645,235
AUTOMATIC DOMESTIC DISHWASHER
Filed Sept. 29, 1947  15 Sheets-Sheet 12

INVENTOR.

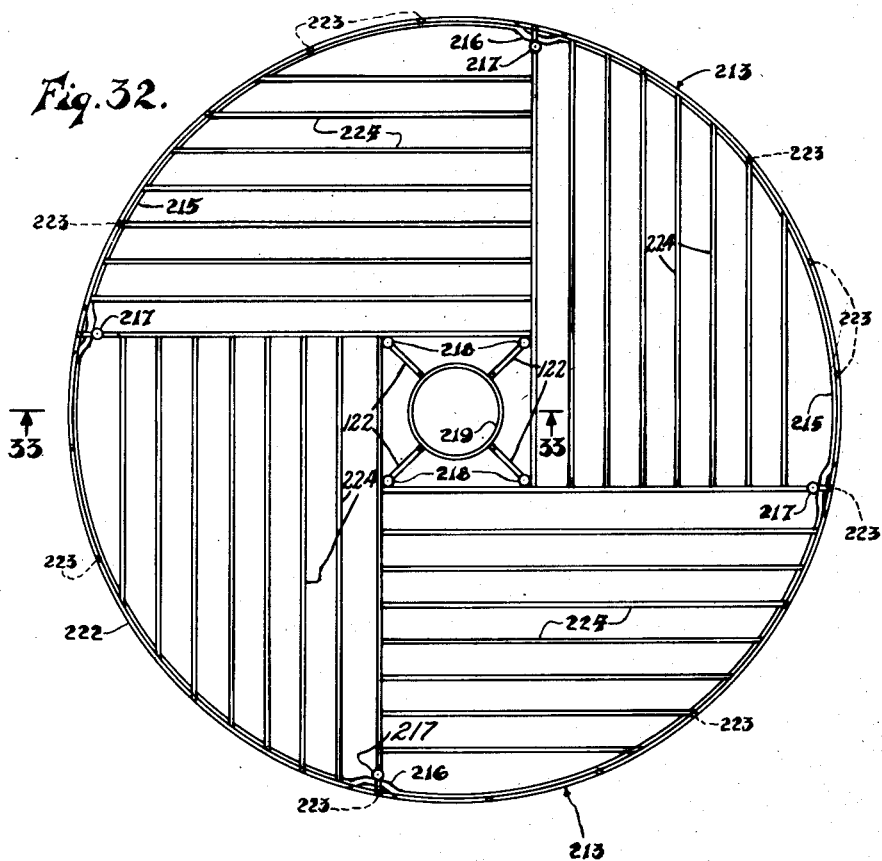
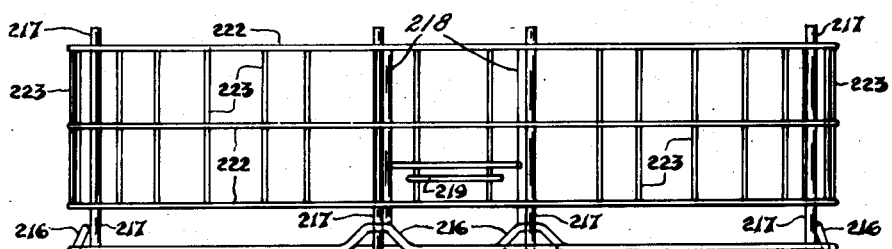
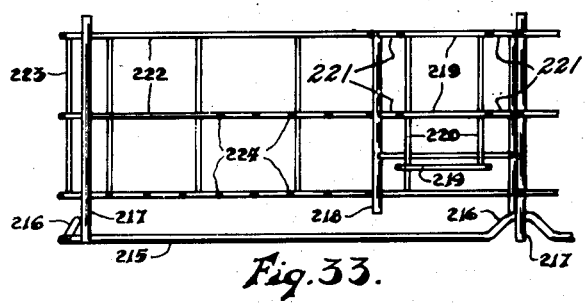

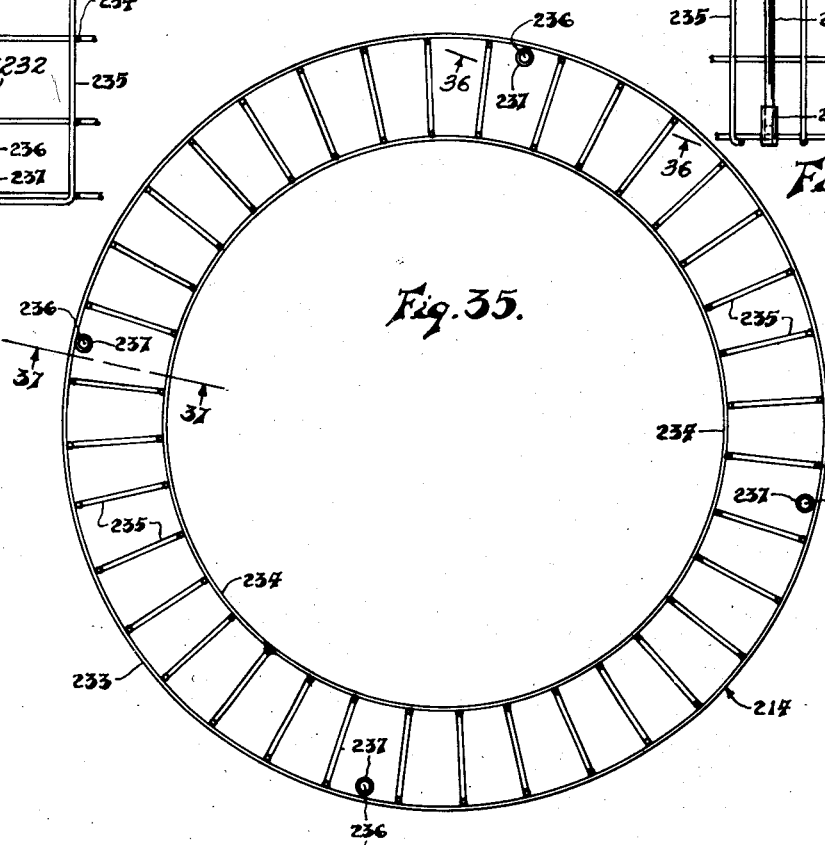

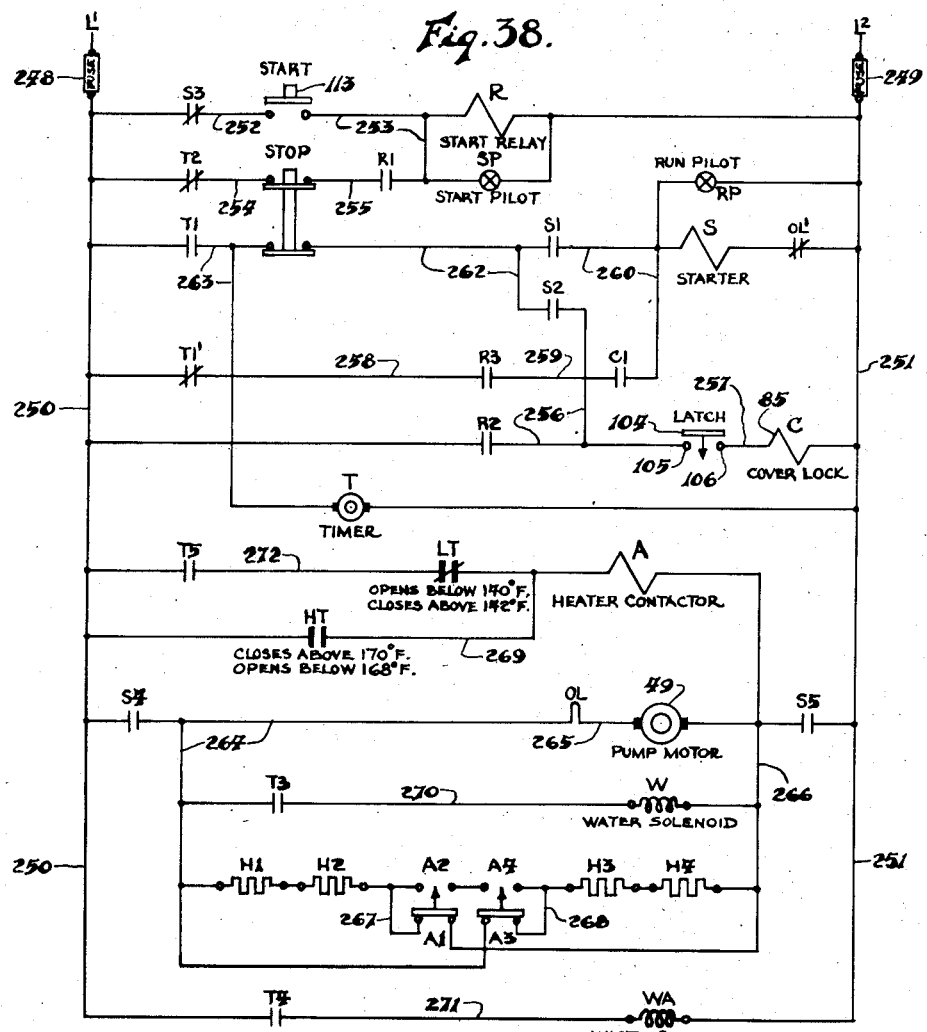

Patented July 14, 1953

2,645,235

UNITED STATES PATENT OFFICE 2,645,235

AUTOMATIC DOMESTIC DISHWASHER

Edwin F. Wheeler, Baltimore, Md.

Application September 29, 1947, Serial No. 776,649

6 Claims. (Cl. 134—58)

This invention relates to a domestic type dish washing machine, which has as its principal object, operation completely automatic through all the cycles necessary to satisfactorily wash dishes, tableware, pots and pans, clean and sanitary. This object is accomplished by providing electrical equipment in a new and novel combination, which in turn automatically controls electrical and mechanical parts of the machine so that all cycles of operation are automatically accomplished after the manual actuation of a single electrical start button.

Another object of this machine is to provide safety means which will prevent operation of the machine unless the top or cover is mechanically locked tight, and will also prevent opening of the cover while the machine is in operation. This safety means includes manually actuated mechanical cover locks and an electrically operated cover lock, of special design.

Another principal object of this machine is to provide means to circulate the washing and rinsing water within the machine in such manner that the said water will be forced under pressure through various tubes or pipes, which will in turn direct this water washing means against the dishes, tableware, pots and pans in the most effective cleansing method.

Still another object of this machine is to provide automatic means of controlling the correct amount of water injected into the machine at the proper time, and automatically heating this water to the proper temperature necessary to accomplish the most satisfactory washing means.

A further object of this machine is to provide automatic means to discharge washing or rinsing water from the machine at the correct time, and discharge such water directly into the waste line of the plumbing system of the house.

Another object is to provide a compact dish washing machine, neat in appearance, yet so constructed and assembled that parts which periodically require cleaning can easily and quickly be disassembled and removed, and reassembled, without special technical or mechanical knowledge or skill, by the average layman or housewife.

A further object of this machine is to provide automatic means of controlling the circulation of hot air within the machine during the "drying cycle," and automatically heating this air to the proper temperature necessary to accomplish the most satisfactory drying means.

Another principal object of this machine is to provide a novel means of automatically rotating the dish basket or container so that it will gradually accelerate in speed during the washing and rinsing cycles of the machine, and gradually decelerate in speed during the drying cycle. The purpose of this kind of rotation is to assure that all surfaces of objects to be washed will be thoroughly cleansed.

Still another object of this machine is to provide a dish basket assembly compact and novel in design which will accommodate all the conventional dishes and tableware required to service up to twelve persons, and which will also accommodate all the pots and pans required to cook the meal for such a service.

A still further object is to provide a dish washing machine which can be constructed by use of modern production manufacturing methods at comparatively low cost.

All of the above objects and novel features of construction and invention will appear as the following description proceeds, substantiated by the accompanied drawings, in which:

Fig. 4 is a bottom plan view of the machine taken along the line 4—4 of Fig. 2;

Fig. 5 is a partial sectional elevation view of the upper portion of the machine taken through the machine from the left front, along the line 5—5 of Fig. 4;

Fig. 6 is a sectional view through the vertical water ejector tube shown on the left side of Fig. 5;

Fig. 7 is a side elevation view of the vertical water ejector tube shown on the right side of Fig. 5, and the low temperature thermostat adjacent thereto, taken along the line 7—7 of Fig. 5;

Fig. 8 is a plan and front elevation view of the supporting bracket for each vertical water ejector tube;

Fig. 9 is an enlarged front elevation view of the right side cover hinge assembly;

Fig. 10 is a plan view of Fig. 9;

Fig. 11 is a partial sectional side view of Fig. 9 taken along the line 11—11;

Fig. 12 is an enlarged front elevation view of the left side cover mechanical lock assembly;

Fig. 13 is a plan view of Fig. 12;

Fig. 14 is a partial sectional side view of Fig. 12 taken along line 14—14 of Fig. 12;

Fig. 15 is an enlarged front elevation of the control button station and electrical lock assembly, taken substantially along the line 15—15 of Fig. 16 and showing the associated housing, for these parts, in section;

Fig. 16 is a right side elevation view of Fig. 15 showing lock housing in section;

Fig. 17 is a side elevation view of a portion of the electrical lock assembly taken along the line 17—17 of Fig. 15;

Fig. 18 is a sectional view of a portion of the electrical lock assembly taken along the line 18—18 of Fig. 15;

Fig. 19 is an enlarged sectional view of the assembly of parts associated with the water pump, taken substantially through the center line of the machine, as viewed from the right side of the machine as in Fig. 2;

Fig. 20 is a bottom plan view of the water pump impeller taken in the direction of line 20—20 of Fig. 19;

Fig. 21 is a partial sectional side view of the water pump impeller taken along the line 21—21 of Fig. 20;

Fig. 22 is a bottom plan view of the lower basket pump impeller taken in the direction of line 20—20 of Fig. 19;

Fig. 23 is a front elevation of the basket impeller shaft as viewed in Fig. 19, and including inserted sections to show details of construction;

Fig. 31 is a front elevation view of the lower basket of the basket assembly as also viewed in Fig. 27;

Fig. 32 is a plan view of Fig. 31;

Fig. 33 is a partial sectional elevation view taken along the line 33—33 of Fig. 32;

Fig. 34 is a front elevation view of the upper basket of the basket assembly as also viewed in Fig. 27;

Fig. 35 is a plan view of Fig. 34;

Fig. 36 is a partial sectional elevation view taken along the line 36—36 of Fig. 35;

Fig. 37 is a partial sectional elevation view taken along the line 37—37 of Fig. 35;

Fig. 38 is an elementary schematic electrical diagram of the electrical equipment which automatically controls the operation of this dish washing machine;

Fig. 39 is a cycle timing schedule which indicates the progressive actuation of the contacts of the timer in relation to the cycle periods of the automatic operation of this dish washing machine.

Figure 1:
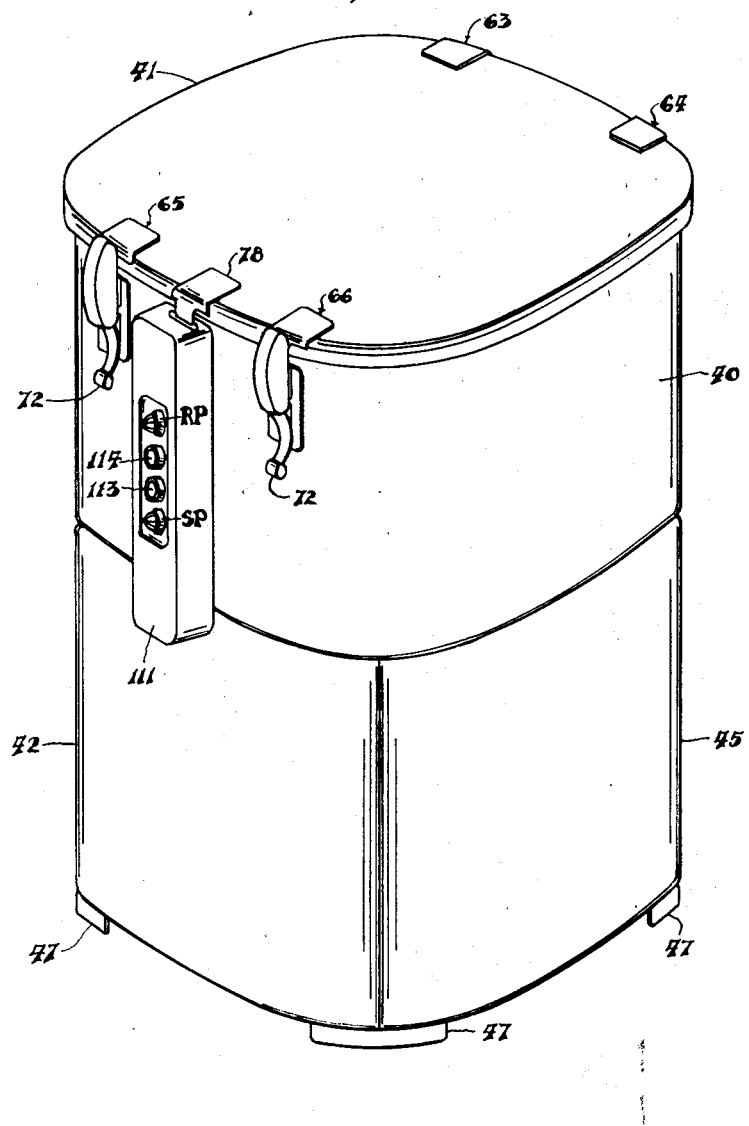
Fig. 1 is a front perspective view of the machine.

In explanation of the drawings, the figures have been produced from full scale drawings and are drawn to scale, except Figs. 38 and 39. Figs. 12, 13 and 14 are full scale, Figs. 9, 10, 11, and Figs. 15 to 26 inclusive are one-half scale, and the balance of the figures are one-quarter scale.

Referring to the drawings, this dish washing machine, (referred to hereinafter as the machine) includes the following major parts; the washing tank 40; tank cover 41; lower enclosure in four pieces 42, 43, 44 and 45; tank supporting legs 46; rubber leg boots 47; machine supporting plate 48; electric pump motor 49; water pump housing 50 and associated cover 51 and gasket 52; waste solenoid valve assembly 53; water solenoid valve assembly 54; dish basket assembly 55; vertical water ejector tubes 56, 57, 58 and 59; water ejector cone 60; and the automatic electrical control assembly enclosed in enclosure 61.

The general assembly of the machine is such that it is compact in design, neat in appearance, and occupies a comparatively small amount of space for a machine of this kind. The tank 40 has a supporting structure consisting of the four curved heavy sheet steel legs 46, which are welded to the said tank 40 and to the heavy circular machine supporting plate 48. The said plate 48 also supports the electric operating motor 49. The said water pump housing 50 is supported by the said tank 40 and attached thereto by means of the housing flange and bolts, with the gasket 52' used to make the connection watertight. The bottom of the said tank 40 is reinforced by a heavy plate 40', which is welded to the tank 40, and has tapped holes to support the water pump housing 50. The said legs 46 extend below the said plate and are provided with rubber boots 47 used to protect the surface of the area on which the machine rests. Most of the operating parts are located below the tank 40, as shown on the drawings, and these parts are covered and enclosed by the four lower enclosure pieces 42, 43, 44 and 45, which are screwed in place to the said legs 46 and individually removable to gain access to the said operating parts. The outside contours of these four lower enclosure pieces when assembled are similar to the said tank 40, so that they present the appearance of being a continuation and part of the said tank, as shown in Fig. 1. The machine when installed in the home, is designed to be permanently connected to the hot water line and waste line of the plumbing system, preferably adjacent to the sink in the kitchen or kitchenette.

The tank 40, made of stainless steel or porcelain covered steel, has curved sides so designed that the inside dimensions across the diagonals are similar, but of greater width than from side to side of the machine. This design allows space to accommodate the four said water ejector tubes 56, 57, 58 and 59, so that they can be located close to the basket; although these additional spaces do not increase the width and depth of the machine to effect the amount of floor space required for the machine as a whole.

The bottom of the tank 40 slopes uniformly from its inside walls toward the center, so that the water will naturally drain by gravity into the water pump housing 50. The areas of the tank bottom which are directly under the four said water ejector tubes 56, 57, 58 and 59, are flat to provide supporting and attaching means for the associated ejector tube supporting castings hereinafter described in detail.

Completely around the circumference of the top of the tank 40, is attached a heavy rubber gasket 62 moulded in one piece, which functions as a means to make the connection between the tank 40 and its cover 41 (in closed position) watertight.

The tank cover 41 has the same shape as the tank 40, but uniformly greater in dimension, and has turned down edges which neatly fit over the top of the rubber gasket 62, when in closed position. The cover 41 is equipped with two hinge assemblies 63 and 64, located at the back of the machine, and two mechanical lock assemblies 65 and 66, located at the front. These two said hinge assemblies are similar in design, but differ in shape necessitated by the different contours of the surfaces of the portions of the tank, and cover to which each hinge is attached. This same condition is true in reference to the two said mechanical lock assemblies, inasmuch as they are located in line with the said hinge assemblies, and equidistant from the center line of the machine from front to back.

Referring specifically to Figs. 9, 10 and 11, these enlarged views show details of construction in reference to the right-hand hinge assembly 64 of the cover. The upper portion of the hinge 67 is attached to the top of the cover 41 by means of screws, rivets or welding, and the lower portion 68 is likewise attached to the outside surface of the tank 40. The hinge pin 69 is preferably held in place by a cotter pin 70, so that the cover 41 can be easily removed from the machine. A glance at the drawings will quickly disclose that the left-hand hinge assembly 63 is designed similar to the described right-hand hinge assembly, but necessarily different in shape.

Referring specifically to Figs. 12, 13 and 14, these enlarged views show details of construction in reference to the left-hand mechanical lock assembly 65 of the cover. This lock includes the bracket 71 which is screwed, riveted or welded to the outside of the tank 40, the handle 72 which is riveted to the said bracket by means of the pivot rivet 73, the latch 74 which is riveted to the said handle by means of the latch rivet 75, the latch pin 76, and the catch 77 which is screwed, riveted or welded to the top of the cover 41. Referring to Fig. 14, the assembly 65 is shown in locked position. In this position the latch rivet 75 is "over the center line" in reference to the handle pivoting rivet 73, which condition naturally holds the handle 72 against the bracket 71 due to the opposing force exerted by the rubber gasket 62 in compression against the cover 41. In order to unlock the assembly 65, the handle 72 is pulled to the left. As soon as the latch rivet 75 has passed the pivot rivet 73, the latch 74 and its pin 76 raises up out of engagement with the catch 77; then when the handle 72 is pulled to the left and rotates (in reference to its pivot rivet 73) sufficiently, the latch pin 76 and catch 77 become fully disengaged; after which the top of the latch 74 is grasped and pulled to the left away from the catch 77 so that the cover 41 can thereby be opened. A glance at the drawings will quickly disclose that the right-hand lock assembly 66 is designed similar to the described left-hand lock assembly, but necessarily different in shape. However, the operation of the right-hand lock assembly 66 is exactly as described above for the left-hand lock assembly 65.

Referring to Figs. 15, 16, 17 and 18, the electrical cover lock is shown in detail. It includes the catch 78 which is screwed, riveted or welded to the top of the cover at the front center-line thereof; the latch 79 which is pivoted to the angle brackets 80 and 81 by means of the pivot pin 82; the electrical solenoid assembly consisting of the frame 83, plunger 84, solenoid coil 85, drive links 86 and 87, latch roller 88, roller pin 89, link pin 90, coil washer 91, plunger extension 92 to which is attached an insulator 93 by means of the screw 94, and a movable contact 95 which is attached to the said insulator 93 by means of the square pin 96 and cotter pin 97. The two stationary contacts 98 and 99 associated with the movable contact 95 are attached to the insulator board 100, which in turn is screwed in place to the metal supporting plate 101. An insulator is placed behind the board 100 in order to insulate the various electric current carrying screws attached to the board 100. This set of contacts is indicated as C1 in Fig. 38. The solenoid frame 83 and brackets 80 and 81 are also attached to the plate 101 by means of screws. The plate 101 is riveted or welded in place to the outside front of the tank 40, and has sufficient thickness to permit holes to be tapped therein for mounting screws of the various parts attached thereto.

The electrical cover lock, as described above, is shown in locked position in Figs. 15 and 16, with the coil 85 energized and the plunger 84 attracted magnetically up into the frame 83. As the drive links 86 and 87 and latch roller 88 are attached together as an assembly with the plunger 84, the said roller 88 is bearing against the bottom of the latch 79, the upper portion of which is engaged with the hole 102 of the catch 78. This electrical cover lock cannot automatically function unless the two mechanical locks 65 and 66 of the cover 41 have previously been manually placed in locked position, after which the said cover 41 cannot be opened as long as the said electrical cover lock functions. This safety purpose is accomplished through the medium of a set of normally-open electrical contacts which are closed as soon as the cover 41 has been mechanically locked. When this occurs, the bottom edge of the catch 78 bears down against the insulator bar 103, which is held in position as shown in Figs. 15 and 18, and the movable contact 104 of the said normally-open electrical contacts attached beneath the bar 103, makes contact with its associated stationary contacts 105 and 106, which in turn are attached to the insulator supports 107 and 108, respectively. These supports 107 and 108 are in turn attached to the plate 101, with insulators 109 and 110, respectively, intervening in order to insulate the current carrying parts of the assembly. Fig. 17 discloses details of the right-hand stationary contact assembly. The left-hand assembly is similar in construction. The closing of the normally-open contacts 104, 105 and 106 completes an electrical circuit to the coil 85, thereby allowing the electrical lock to function, as explained hereinafter in reference to Fig. 38.

As shown in Figs. 1, 2, 3, 4, 15, and 16, a housing 111, neat in appearance and of pleasing design, is provided to completely enclose the electrical lock assembly, a conventional type of electrical control station 112, and two conventional types of pilot lights SP and RP. This station includes a normally-open set of contacts operable by a start button 113 and two normally-closed sets of contacts simultaneously operable by a stop button 114. Two multi-wire rubber covered cables 115 and 116 are used to electrically connect the station 112 and electrical lock assembly, respectively, to a disconnecting cap 117 and plug 118; and another multi-wire rubber covered cable 119 connects from the said plug 118, through a rubber bushing 120, to the automatic electrical control assembly enclosure 61. This disconnecting means for the station 112 is to allow removal of the housing 111, which is attached in place to the studs 121 by means of the screws 122. The studs 121 are screwed in place to the plate 101. An oblong hole 123 having a rubber washer 124 is provided at the top of housing 111, through which the catch 78 enters when the cover 41 is closed. The said rubber washer 124 provides a watertight connection between the catch 78 and housing 111. The said pilot light SP has a green colored lens, and when lighted indicates the effective operation of the start relay during the "start cycle" of the machine operation. The said pilot light RP has a red colored lens, and when lighted indicates that the machine is in normal running operation.

One of the main principles of operation of this machine involves the unique method of circulating water, used in both cycles of washing and rinsing, by means of a water pump, which is so designed that its associated parts and the said water combines to hydraulically drive and rotate the dish basket assembly 55.

Referring to Figs. 19 to 26 inclusive, the water pump assembled in the casting or housing 50, includes the water pump impeller 125, impeller drive shaft 126, which is connected to the electric pump motor 49 through a conventional flexible coupling 127, and the housing cover 51 which includes the oil-impregnated bronze bushing 128, thrust bearing 129, watertight packing 130 and packing nut 131. These parts comprise the portion of the pump which circulates the washing and rinsing water through the machine.

The hot water line of the plumbing system is directly connected to the water valve 54, which is connected by pipe fittings to the water inlet 132 of the pump housing 50. Also, the waste outlet 133 is directly connected, preferably through a grease trap, to the waste line of the plumbing system. During two of the cycles of operation of the machine, each prior to the washing cycle and the rinsing cycle, a sufficient amount of water enters the machine by the automatic opening of the water valve 54. The amount of water required is such that its level must be maintained just below the bottom of the basket assembly 55 during the water circulation, which is as follows:

The water passes through the strainer 134, hole 135, and thrust bearing 136, and through the holes 137 of the lower basket pump impeller 138, into the pump impeller chamber 139, where it is picked up by the rotating pump impeller blades 140 and forced out through the pump outlets 141, 142, 143 and 144, into the brass pump tubes 145, 146, 147 and 148, respectively, thence through the vertical brass water ejector tubes 56, 57, 58 and 59, respectively. A greater portion of the water thus forced into each said ejector tube is expelled at high pressure through the numerous ejector holes in the tubes, such as 149, which are so located as to direct the expelled water in the most efficient manner against the contents of the dish basket assembly 55. A smaller portion of the water forced into the said vertical ejector tubes passes through the top of each tube into the smaller diameter horizontal brass tubes 150, 151, 152 and 153, respectively, all of which converge into the cone fitting 154, and ejector cone 60 which in turn expels the thus accumulated water through its ejector holes 155 and down over the top of the contents of the basket assembly 55. The combination of ejected streams of water from all the ejector holes 149 and 155 is designed to completely reach all surfaces of dishes, tableware, pots or pans which have been placed in the machine to be washed. Naturally all water ejected, as described above, falls to the bottom of the tank 40, and is re-circulated in the same manner until the pump motor stops rotating.

It will be noted that each vertical water ejector tube encloses a conventional cartridge type immersion electric heater 156, such as shown in Fig. 6. These heaters are obtained as an assembly including the immersion tube 157 sealed into a pipe threaded fitting 158 at the top and having an electrical connection junction box 159 at the bottom. Electrical rubber covered cables connect these boxes 159 to the control assembly enclosure 61. These heaters 156 automatically heat the water to a predetermined temperature of approximately 170 deg. F., during the two water flowing cycles and two water circulating cycles of the machine operation, as hereinafted explained. These heaters also function automatically during the other cycles of the machine, but are then controlled to maintain a predetermined air temperature of approximately 140 deg. F., as hereinafter explained.

Referring to Figs. 5, 6 and 7, it will be noted that two specially designed castings are provided to connect the water pump tubes 145, 146, 147 and 148 to the vertical water ejector tubes 56, 57, 58 and 59, respectively. The lower castings 160, 161, 162 and 163, respectively, provide screw type hubs 164, 165, 166 and 167, respectively, for connections to the said water pump tubes, and also provide similar type hubs 168, 169, 170 and 171, respectively, for connection of the immersion electric heaters 156. The upper castings 172 are bolted to the said lower castings through appropriate holes in the bottom of the blank 40, and these connections are made watertight by means of the gaskets 173. The said upper castings have watertight tapered holes into which are inserted the said vertical water ejector tubes, as shown in detail in Fig. 6. These upper castings also include integrally casted roller supports, such as 174 which support the rollers 175 by means of the hardened steel roller pins 176. These rollers are preferably made of oil-impregnated bronze to make them self-lubricating, and are used to support the basket assembly 55.

Figs. 4 and 7 also show the preferred location of the low temperature thermostat LT which is attached in a hole of the tank 40 by means of the hexagon head male screw base 177 furnished as a part of this conventional electrical device, which is screwed into a female threaded hub 178 placed on the inside of the tank. A circular gasket 173' is furnished for watertight connection similar to the said gaskets 173, except in shape. This thermostat is used to control the air temperature within the machine during the "drying cycle," and is adjustable in degrees Fahrenheit by means of the screw 179. This adjustment is set so that its associated contacts open below 140 deg. F. and close above 142 deg. F. so that the air temperature can thus be maintained at what is considered the best temperature for drying dishes, tableware, pots, pans and like objects. This device electrically connects to the electrical control assembly enclosure 61 by means of a conventional rubber covered two-wire cable.

It will also be noted that specially designed castings 180 are welded to the top of each vertical water ejector tube, and are provided with extended sides 181 which are used for bolted connections to brackets 182, which are in turn welded to the inside surface of the tank 40. This construction allows each ejector tube 56, 57, 58 and 59 to be easily and quickly removed from the machine for cleaning purposes, merely by removing the thumb screws 183 and by pulling the tube assemblies up and out of the tapered holes in the top of the upper castings 172. The said castings 180 are also provided with rubber socket joints 184 into which snugly fit brass ball socket extensions 185 of fittings 186; from which the horizontal tubes 150; 151, 152 and 153 extend and connect to the cone fitting 154. The design and construction of the fittings 186 and 154 includes extended sides similar to 181 of castings 189, which are also used for thumbscrew bolt connections to supporting plates 187 and 188, respectively, which are in turn welded in place to the inside surface of the tank cover 41. This construction allows the fittings 186 and 154 and their interconnected horizontal tubes 150, 151, 152 and 153, to be easily and quickly unbolted and completely removed from the cover 41 for cleaning purposes. Inasmuch as the said horizontal tubes have tapered ends, they can also be easily and quickly disconnected from their associated fittings 186 and 154, after the complete assembly has been removed from the cover. The water ejector cone 60 can also be easily and quickly unscrewed from the cone fitting 154 for cleaning purposes.

It will be noted that the pump tubes 145, 146, 147 and 148 are provided with compression type screw fittings 139; which act as an easy and quick means of disconnection from the hubs 134, 165, 166 and 167, respectively, and from the hubs of the pump outlets 141, 142, 143 and 144, respectively, so that they can be removed and separately cleaned.

It will also be noted that the electric immersion heaters 156, can be easily and quickly removed from the castings 160, 161, 162 and 163; by first disconnecting the electrical connections within the junction boxes 159; then by unscrewing the threaded fittings 158; so that any or all of these heaters 156 can be removed for separate cleaning; or replacement if they become defective.

It can readily be seen from the previous description that all parts through which the water circulates, can be easily and quickly removed; periodically by the average layman or housewife for cleaning purposes; and as each group of the different parts is exactly identical in construction they are interchangeable; and no effort is required to replace each part into its previous location in the machine. These features carry out two of the inventor's objects; (1) easy cleaning of parts, and (2) construction and manufacture of parts on a production basis at comparatively low cost.

Referring specifically to Figs. 19 to 26, inclusive, the following is a detail description of the unique and novel method of hydraulically rotating the basket assembly 55, which is a principal object and claimed as a part of this invention. It is believed by the inventor that in order to completely and thoroughly clean dishes, tableware, pots or pans or like objects in a dish washing machine of this type, for household domestic use, the said objects to be cleaned, and hereinafter referred to as contents of the basket assembly 55, must be rotated at a gradual accelerated speed during the washing and rinsing cycles of the machine operation, and must be rotated at a gradual decelerated speed during the drying or last cycle of operation. It is also believed by the inventor that such type of basket assembly rotation should not be accomplished by a direct gear, chain and sprocket, or other mechanical means; which would possibly cause damage to parts of the machine, in the event that any part or parts of the contents of the basket assembly 55 becomes displaced and jams between the rotating basket assembly 55 and other stationary parts of the machine. Such a direct mechanical means of rotation would constitute a hazardous condition, and would also defeat one of the objects of this invention, namely low cost of manufacture, inasmuch as this undesirable mechanical means of rotation would be complicated and costly to produce.

Referring to Fig. 19, the hydraulic method of rotating the basket assembly 55, includes the following parts: the lower basket pump impeller 138 is centrally positioned directly above the pump impeller 125; and is connected to the upper basket impeller 190, by the basket impeller shaft 191 shown in detail in Fig. 23. The bottom end of the said shaft 191 pivots inside the top end of the impeller drive shaft 126, while the top of the enlarged diameter portion 192 of the said shaft 191 fits into the oil-impregnated bronze bearing 193, which fits tightly in the bearing cap 194, which in turn fits into the top portion 195 of the housing 50. The upper square portion 196 of the said shaft 191 fits into the center of the upper basket impeller 190, in like manner as the lower square portion 197 fits into the center of the lower basket pump impeller 138. The round top extremity 198 of the said shaft 191 fits into the oil-impregnated bronze bushing 199, which in turn fits tightly into the center of the basket support casting 200. In order that the entire basket impeller assembly, described above, may turn independently and freely in reference to the water pump impeller 125, thrust bearings 201, 202, 136 and 203 are positioned as shown in the reference drawing. It will be noted that the thrust bearing 136 is designed so as not to interfere with the flow of water through the holes 137 of the lower basket pump impeller 138. All of the said thrust bearings are of the conventional ground type with ball retainers which are not shown in order to simplify the drawing.

It will be noted in Figs. 19 and 23, that the basket impeller shaft 191 is so designed that its associated parts can be easily and quickly disassembled therefrom; from either end, inasmuch as the enlarged diameter portion 192 is located near the vertical center of the shaft 191 as a whole, and the said portion 192, having the greatest cross-section, can sustain the maximum strain on the said shaft 191 at its pivot and bearing points within the bearing 193.

The method used in this invention to drive or rotate the basket impeller assembly, as described above, is similar to the hydraulic coupling principle, but differs in the design of the included parts; which purposefully are designed to allow greater slippage between the driver (pump impeller 125) and driven (lower basket pump impeller 138) parts. This greater slippage is necessary in the operation of this machine, inasmuch as the pump impeller 125 must rotate at high speed (1725 R. P. M.) to exert the necessary pressure for the water circulation, while the lower basket pump impeller 138 needs only to rotate at comparatively low speed in a gradually accelerated motion. The design of the pump impeller, as shown in Figs. 19, 20 and 21, is such that its blades 140 are shaped to draw water into the center portion of the said impeller 125; and curved at the extremities of the blades 140; so as to expel the water out through the outlets 141, 142, 143 and 144 from the pump impeller chamber 139. Fig. 20 also shows an arrow which indicates the rotation of the pump impeller 125; which corresponds to a clockwise rotation of the electric pump motor 49, facing the drive shaft end.

The close proximity of the lower basket pump impeller 138 directly above the pump impeller 125, causes it to rotate when the whirling motion of the water set up by the said impeller 125, exerts a like rotating force against the vanes 204 of the said impeller 138, thereby causing the said impeller 138 and its associated parts, shaft 191 and upper basket impeller 190, to gradually rotate in accelerating manner in the same direction as the said impeller 125, due to the slippage between the said impellers 125 and 138, which is natural in a hydraulic principle of drive such as described above and included as part of this invention. Additional details of construction of the lower basket pump impeller 138 are shown in Fig. 22. Of course, during the cycles of operation of the machine when the water is automatically drained from the machine, a basket impeller assembly gradually decelerates in rotation, and re-accelerates in rotation when the water medium of drive is again forced into the machine by the automatic opening of the water valve 54.

The upper basket impeller 190 fits inside and rotates within its associated impelling clutch 205 to form a hydraulic coupling assembly. The vanes 206 of the said impeller 190 picks up the water in the bottom of the tank 40, and during rotation, force this water against the vanes 207 of the said clutch 205, causing rotation thereof by the principle of hydraulic drive. The vanes 206 are designed with a slope upwards so that the water is drawn into the clutch assembly, which in turn tends to exert a hydraulic force against the basket assembly 55 which is intended to be rotated, inasmuch as the clutch 205 is rigidly attached to the basket support casting 200, by means of the screws 208.

Figure 24:
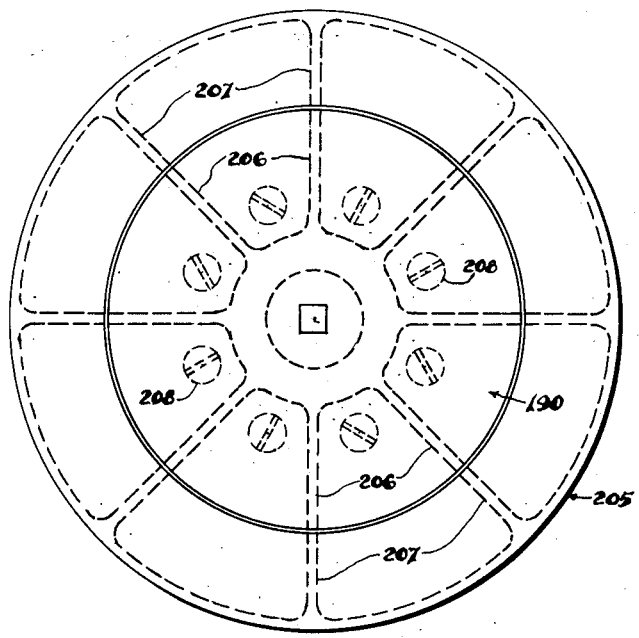
Fig. 24 is a bottom plan view of the assembly of the upper basket impeller and its associated impelling clutch taken in the direction of line 24—24 of Fig. 19.

Fig. 24 shows a bottom plan view of the above described impeller clutch assembly, showing additional details of construction and the relative position of the vanes 206 of the said impeller 190, and the vanes 207 of the said clutch 205. The screws 208 used to attach the clutch 205 to the basket support casting 200 are also shown.

Figure 25:
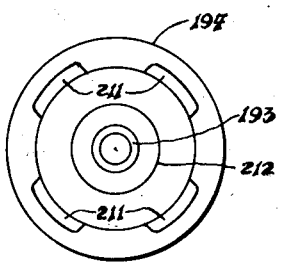
Fig. 25 is a bottom plan view of the upper basket impeller shaft bearing cap taken in the direction of line 24—24 of Fig. 19.
Figure 26:
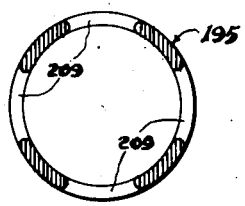
Fig. 26 is a sectional view of the upper portion of the water pump housing taken along the line 24—24 of Fig. 19.

Fig. 25 shows a bottom plan view of the bearing cap 194, showing additional details of construction relative to its position on the top portion 195 of the housing 50, which portion is shown partially in section in Fig. 26. The openings 209 allow passage of water into the housing 52, while the extensions 210 snugly fit into the recesses 211 of the bearing cap 194. The center portion 212 of the said cap fits into the upper portion of the strainer 134 which is thereby held in place. The lower portion of the said strainer 134 fits snugly into the hole 135 of the housing 50 to hold it in position at the bottom. Obviously, this strainer 134 is used to strain all foreign matter of food particles from the water before it enters the pump impeller chamber 139. It should be noted that the rapid rotation of the pump impeller 125 (approximately 1725 R. P. M.) imparts a whirling motion to the water from the pump chamber 139 up to the bottom of the tank 40, which naturally tends to drive away any foreign matter from the said strainer 134, thereby providing self-cleaning of the strainer holes.

Referring to Figs. 27 to 37, inclusive, the basket assembly 55; which is a major part of this invention and used to hold and support any dishes, tableware, pots or pans or like objects intended to be washed in the machine; is shown in complete detail in reference to detail construction. The various objects of invention of this major part will be disclosed in the following description:

The design of this basket assembly is especially suited to conform to the design of associated parts of this machine, so that all the said parts shall function to accomplish all the objects of this invention. To this end, the general construction of this basket assembly 55 is of stainless steel wire of minimum quantity, diameter and weight, consistent with the strength desired to hold a complete load of objects to be washed. The wire fabricated parts of the said assembly 55 consist of the lower basket 213 of the assembly, as shown in detail in Figs. 31, 32, and 33; and the upper basket 214, as shown in detail in Figs. 34, 35, 36 and 37. The wire fabrication of these two baskets 213 and 214 is done by conventional means of spot welding or the like. Referring to Figs. 31, 32 and 33, the lower basket 213 has a heavy gauge circular wire supporting structure 215 having four bent up sections 216 to which are welded the four vertical sidewall supporting rods 217. Similar size vertical rods 218 support the center portion of the lower basket 213, which is designed to hold the various pieces of tableware, such as knives, forks, teaspoons, tablespoons, and other similar objects, in upright position. Circular wires 219, vertical wires 220, and horizontal wires 221, segregate this tableware section into sub-sections. Welded in place to the said supporting rods 217 are the circular sidewall wires 222, which are in turn welded together by the vertical sidewall wires 223. Horizontal wires 224 of various lengths, and positioned as shown in the drawings, are welded to each other and to the said circular sidewall wires 222, and are designed to hold various conventional diameter flat plates and saucers on edge between the said wires 224 in such manner that the inside food holding surfaces face out toward the outside circumference of the basket 213. The top extremities of the said rods 217 are used to support and hold in position the upper basket 214. Various sizes of pots and pans may also be placed in this lower basket 213 and arranged in the best manner for efficient washing.

Figures 27, 28:
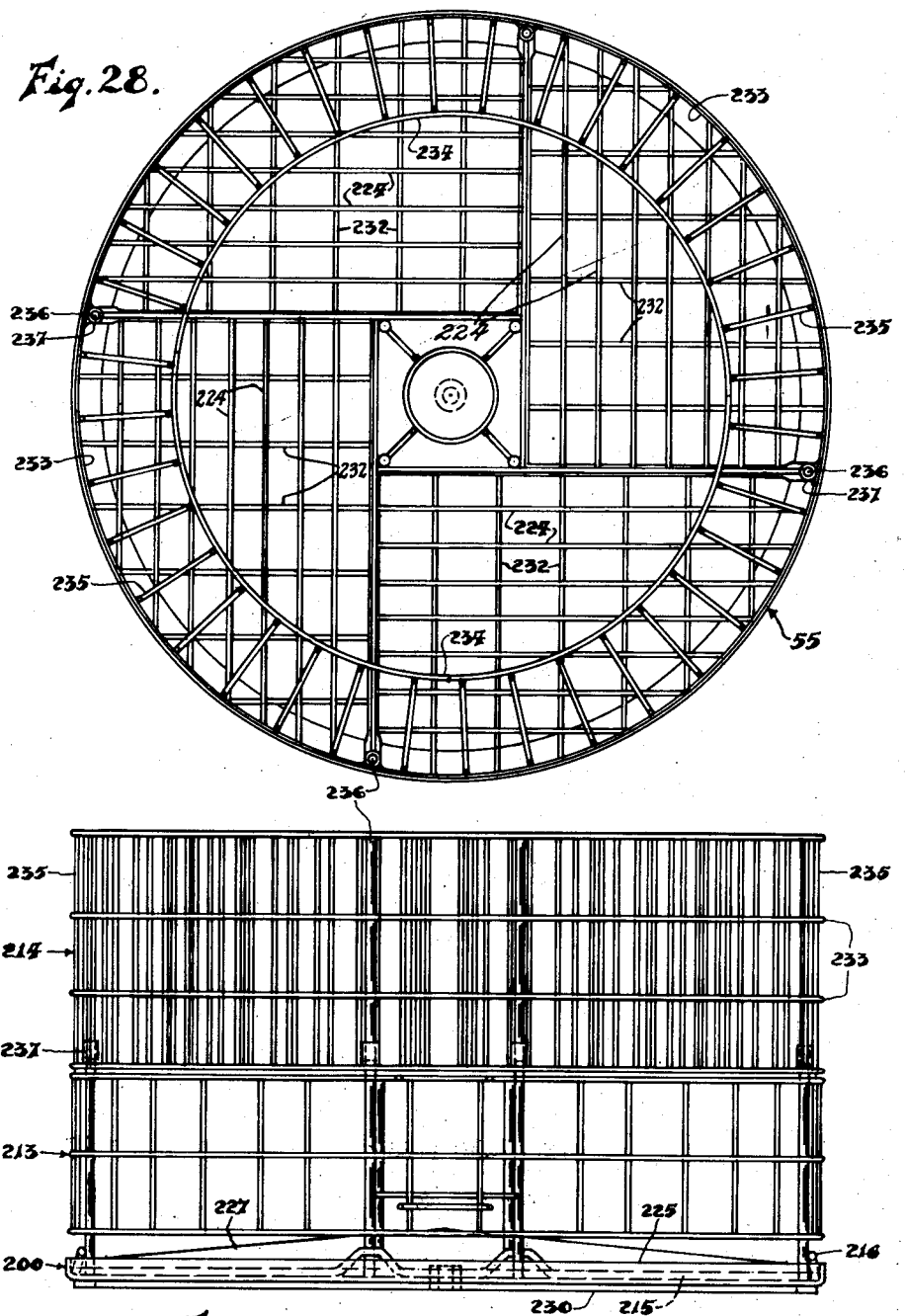
Fig. 27 is a front elevation view of the complete basket assembly.
Fig. 28 is a plan view of Fig. 27.
Figures 29, 30:
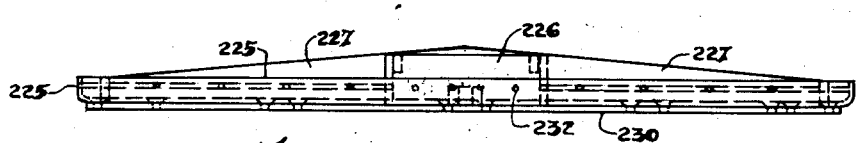
Fig. 29 is a front elevation view of the basket support casting as also viewed in Fig. 27.
Fig. 30 is a plan view of Fig. 29.

Referring to Figs. 29 and 30, the basket support casting 200 is constructed of aluminum, magnesium or similar lightweight material cast in one piece and including the circular angle shaped outer rim 225, connected to the center portion 226 by means of the ribs 227. The holes 228 in the said ribs 227 near the said rim 225 are used to hold the lower extremities of the said rods 217 of the lower basket 213, and the holes 229 in the said center portion 226 are used to hold the lower extremities of the said rods 218. The supporting structure 215 of the lower basket 213 fits snugly into the inside of the said rim 225, as shown in Fig. 27. This provides an easy and quick means of assembling the lower basket 213 with its associated support casting 200. A circular flat track 230 is screwed in proper position beneath the said rim 225 by means of the flat head brass screws 231, and is used to engage the four rollers 175 of the said castings 172, and rotate upon these said rollers when the basket assembly 55 rotates. This track 230 and rollers 175 thus form a low friction supporting means for the rotation of the basket assembly 55, so that the hydraulic basket impelling means, previously described, may actuate without load and therefore with very low frictional loss. Wire rods 232 of various lengths are horizontally positioned and riveted in place in the basket support casting 200, as shown in Figs. 29 and 30, and are used to support the lower edges of the various conventional diameter flat plates and saucers held in place by the lower basket 213, as explained in the preceding paragraph. It will be noted in Fig. 28 that the said rods 232 are positioned at right angles to the horizontal wires 224 of the lower basket 213. It will also be noted that the assembly of the support casting 200 and the lower basket 213 forms four identical sections, each of which can hold and accommodate the same type and size dishes, to include a total of four, eight, or twelve sets of dishes. Cups may either be placed close to the sidewalls of the lower basket 213 with their inside surfaces facing out, or be placed in like position in the upper basket 214.

Referring to Figs. 34 to 37, inclusive, the upper basket 214 is generally constructed of light gauge wire including the outer circular horizontal wires 233 and inner circular horizontal wires 234, welded together with the evenly spaced U-shaped wires 235, to form a continuous circular U-shaped retainer, as shown in Fig. 37. This circular retainer is primarily designed to hold glasses of various conventional sizes positioned with their open rims facing down, but cups can also be placed therein positioned on their sides with the inside surfaces facing out, so that the washing and rinsing water will naturally drain out. Vertical sidewall supporting rods 236 of like size as the said supporting rods 217 of the lower basket 213, are welded in position to the outer circular horizontal wires 233, and are so located that the couplings 237 welded at their lower extremities line up with and are attachable to the top extremities of the said rods 217. These couplings 237 provide an easy and quick means of assembling the upper basket 214 to the lower basket 213, and keep the two said baskets perfectly in line with each other.

It is of course understood that the design of the above described basket assembly 55 may be varied in form and construction without departing from the spirit of the invention or sacrificing any of its advantages, provided the same falls within the scope of the invention and accompanied claims.

Referring to Figs. 2, 4, 5 and 19 the high temperature thermostat HT is shown in its preferred location screwed into the side of the water pump housing 50. It is of conventional design similar to the thermostat LT, heretofore described. This thermostat is used to control the water temperature within the machine during the "washing cycle" and "rinsing cycle," and is adjustable and set to close its associated contacts above 170 deg. F. and open them below 168 deg. F., so that the water temperature can be thus maintained at what is considered the best temperature for the cleansing of food particles from dishes, tableware, pots, pans and like objects. This device electrically connects to the electrical control assembly enclosure 61 by means of a conventional rubber covered two-wire cable.

Referring to Fig. 19, the waste solenoid valve assembly 53 is of somewhat conventional design in reference to the construction of the cylindrical solenoid housing 238 enclosing the solenoid coil WA, and its associated plunger 239 and plunger shaft 240. These parts are maintained watertight by means of the flexible bronze bellows type boot 241, which is brazed to the top of the partially cone-shaped waste valve 242, which in turn is attached to the said plunger shaft 240 at its lower screw threaded extremity 243. The upper end of the said boot 241 is flanged out to a diameter equal to that of the solenoid housing 238, and with two suitable and like gaskets 243 and 244, above and below the said flanged out portion 245, the said housing 238 is bolted in place over the large hole 246 of the water pump housing 50. The said hole 246 is of larger diameter than that of the said boot 241 and waste valve 242, so that the entire waste valve assembly 53 can be removed from the water pump housing 50. It will be noted that the partially cone-shaped waste valve 242 normally fits in watertight manner in its associated valve seat 247, due to the compressive force exerted by the said boot 241. A semi-circular shaped baffle plate B is riveted to the water pump housing 50, in such position between the said waste valve assembly parts, the boot 241 and valve 242, and the water inlet 132, so that the pressure of the water entering the water pump housing 50 will not affect the proper seating of the said waste valve 242 in its associated valve seat 247.

Figure 2:
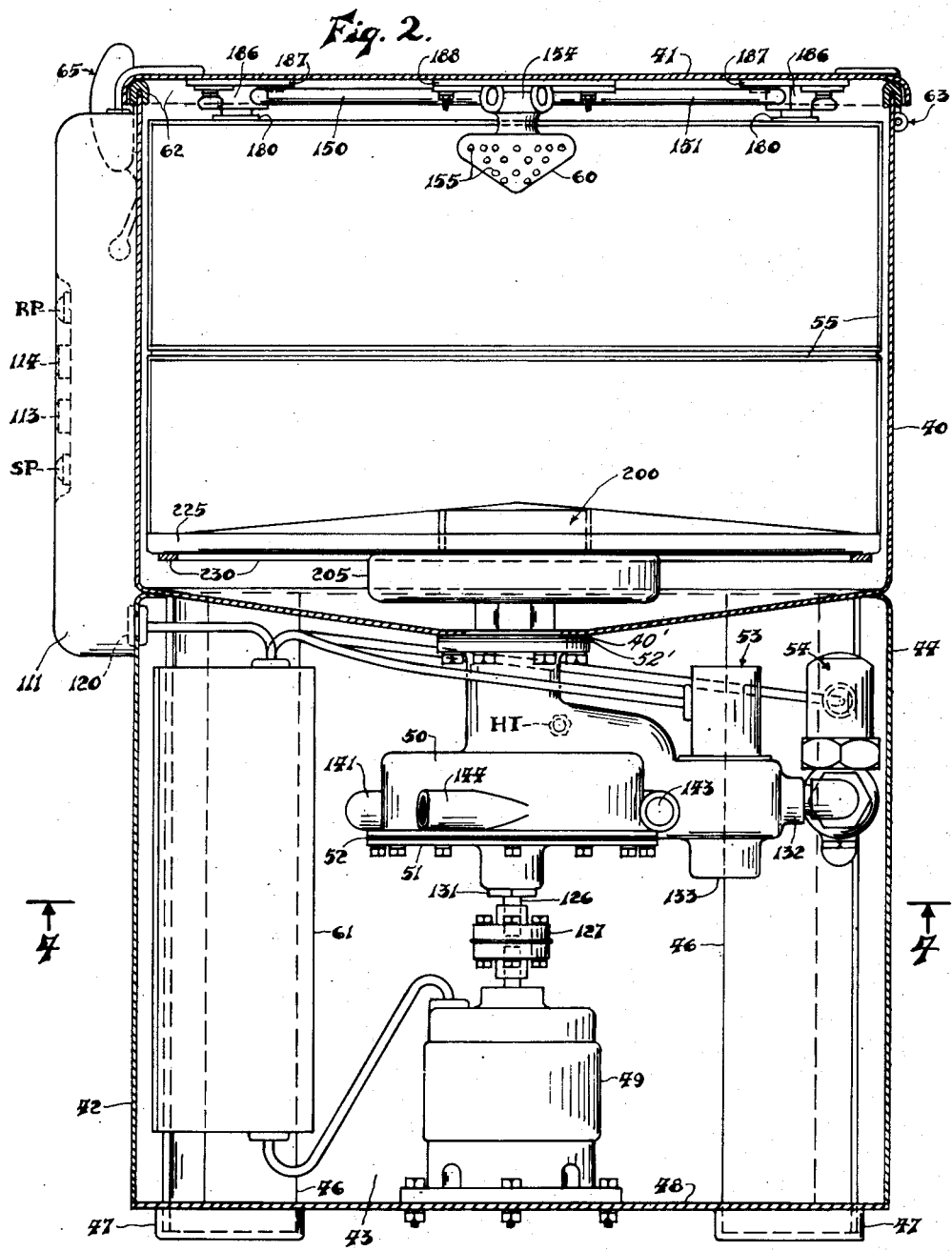
Fig. 2 is a partial sectional elevation view taken from the right side of the machine.
Figure 3:
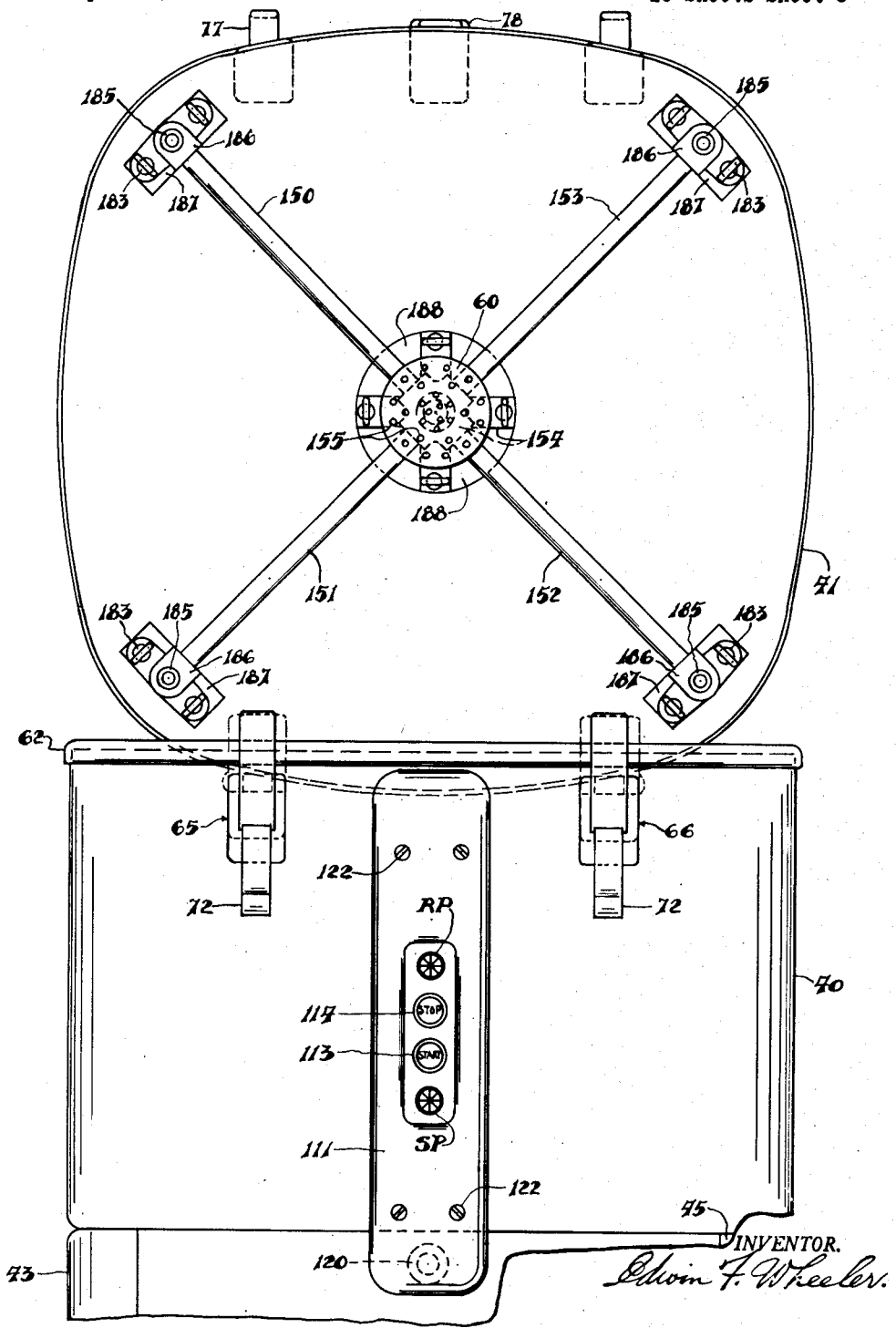
Fig. 3 is a front elevation view of the upper portion of the machine taken with the top or cover opened at ninety degrees from the horizontal.

As shown in Fig. 2, a conventional rubber covered cable electrically connects the said solenoid coil WA with the control assembly enclosure 61. The water valve solenoid coil W is electrically connected to the said enclosure 61 in similar manner.

The following is a general description of the complete operation of this dish washing machine, written in progressively sequential manner, with each step numbered:

1. Dishes and tableware to be washed are properly stacked and positioned in the basket assembly 55, after first being scraped of all surplus food particles.

2. A sufficient quantity of modern type cleaning "detergent" is sprinkled over the contents of the basket.

3. The tank cover is closed and locked tight by manual actuation of the two mechanical cover locks.

4. The start button located at the front of the machine is momentarily pressed, thereby operating the start relay.

5. The various parts of the electrical control equipment begin to function automatically, thereby starting the electric pump motor 49 and its associated water pump, and energizing the four electric immersion heaters. This is the "start cycle" which requires four seconds.

6. The first "water cycle" functions to open the water valve 54, thereby allowing sufficient water to flow from the hot water plumbing line into the machine, until it reaches the proper level just below and clear of the bottom of the basket assembly. This cycle is estimated to require 30 seconds.

7. The "washing cycle" of 9 minutes, 26 seconds functions, during which time the washing water is circulated through the machine and simultaneously heated to a temperature of approximately 170 deg. F., while being expelled and forced against the contents of the basket, which rotates in a gradual accelerating manner to attain its greatest speed of rotation at the end of this cycle.

8. The first "waste cycle" functions causing the waste valve 53 to be opened, thereby allowing all the washing water to drain out into the waste line of the plumbing system. This cycle is estimated to require one minute.

9. A time delay of 10 seconds takes place to allow the waste valve 53 to close before the second "water cycle" begins.

10. The second "water cycle" functions to again open the water valve 54 and fill the machine with the proper amount of fresh water, as described above in step 6.

11. The "rinsing cycle" of 5 minutes, 20 seconds functions, during which time the rinsing water is heated and circulated through the machine for 2 minutes, 20 seconds, then water valve 54 and waste valve 53 simultaneously open to allow fresh water to enter the machine, and circulate and heat along with the said rinsing water, and simultaneously allow a like quantity of the mixed rinsing water to drain out of the said waste valve. The pressure of the incoming fresh water will cause it to force past the waste outlet 133, aided by the baffle B, and be drawn up the passage of housing 50 into the water pump. This water movement will also tend to retard the gravity discharge of the mixed rinsing water through the said waste outlet so that the quantity of fresh water entering the machine will approximately equal the quantity of mixed rinsing water leaving the machine during the next 3 minutes of step 11. This operation will cause the heavier particles of food in the rinsing water to discharge through the said waste outlet and thereby gradually improve the cleanliness of the mixed rinsing water during the said final 3 minutes of step 11. The water and basket action is the same as described above in step 7.

12. The second "waste cycle" functions to drain out all the rinsing water in like manner as described above in step 8.

13. The "drying cycle" functions during which time the pump continues to operate and circulates hot air (maintained at an approximate temperature of 140 deg. F.) through the machine, and the basket gradually decelerates in speed of rotation.

14. One second before the end of the "drying cycle" of 2 minutes, all electrical controls are automatically de-energized and all operation of the machine ceases. The tank cover may then be opened by unlocking the two mechanical cover locks, and the contents of the basket, which have been thoroughly dried, may be removed and stored away. If it is otherwise desired, the contents of the basket may be retained inside the locked machine until they are required to be used for the next meal. This provides a sanitary hermetically sealed method of storing the dishes, etc.

The above description of operation is based on approximate time periods of cycle, in accordance with the cycle timing schedule shown in Fig. 39. It is of course understood that these time periods may vary more or less due to the characteristics which may develop in the various parts of the machine during manufacture. However, any changes required in this cycle timing schedule is believed to be within the spirit and scope of the invention and accompanied claims.

It should also be understood that the above described 14 steps of machine operation also apply to the cleaning of pots, pans or other objects used to prepare or serve a meal, or for the cleaning of chinaware, vases or crockery or the like, which may be normally cleaned by hand.

Referring specifically to Figs. 38 and 39, the following is a detail description of the electrical equipment, and its complete automatic operation, included as a part of this invention, which automatically functions to accomplish the last 11 steps of the above described 14 steps of operation of this dish washing machine:

Lines $L^1$ and $L^2$ are attached to the 110 volt, 60 cycle or 110 volt D. C. circuit of the home by means of a rubber-covered cable and attachment plug of conventional design. This cable not shown on the drawings connects to the electrical control assembly enclosed in the enclosure 61. The said control assembly includes a conventional start relay, having three sets of normally-open contacts R1, R2 and R3 actuated by an electric coil R; a conventional starter or magnetic contactor, having four sets of normally-open contacts S1, S2, S4 and S5, and one set of normally-closed contacts S3, all actuated by an electric coil S, connected in series with a set of normally-closed contacts OL' associated with a conventional thermal overload relay OL used for overload protection of the motor 49; another conventional heater contactor or magnetic contactor, having two sets of single-pole double-throw contacts with normally-closed contacts A1 and A3 operable to open, and then close their associated normally-open contacts A2 and A4, respectively, by actuation of an electric coil A; a conventional type timer having five sets of snap-action type contacts including one set of single pole double-throw contacts with normally-closed contacts T1' and normally-open contacts T1, one set of single throw normally-closed contacts T2, and three sets of single throw normally-open contacts T3, T4 and T5, all actuated in preferred sequence as shown in Fig. 39 by means of the timer motor T; two fuses 248 and 249 used for short-circuit protection of the entire electrical control assembly and associated electrical circuits; and a conventional wire terminal block, not specifically shown on the drawings. Other parts of the electrical equipment located elsewhere on the machine, as previously described, are electrically inter-connected with the equipment located within the enclosure 61, as described above, and also interconnected with the high temperature immersion thermostat HT, and low temperature immersion thermostat LT, previously described.

In conjunction with the novel combination of electrical equipment described above, the various electrical circuits associated therewith are described as follows in progressively sequential manner and are numbered to correspond to the steps associated with the 14 steps of the complete operation of this dish washing machine, as previously written above:

4. When the start button 113 is momentarily pressed an electric control circuit is closed from line L' through fuse 248, wire 250, normally-closed contacts S3, wire 252, the said start button contacts 113, and wire 253 to one side of the coil R and start pilot SP; thence through wire 251, and fuse 249 to line L2. The consequent energization of coil R causes its associated normally-open contacts R1, R2 and R3 to simultaneously close. The closing of contacts R1 completes a parallel electric control circuit from wire 250, through the normally-closed contacts T2, wire 254, through the top normally-closed contacts of the stop button 114, wire 255, the said contacts R1, and wire 253 to the said coil R and pilot SP, thus holding the said coil R and pilot SP energized. The said pilot SP when lighted indicates the effective operation of this step.

5. The closing of contacts R2 completes another electric control circuit from line 250, through the said contacts R2, wire 256, through the latch contacts 105, 104 and 106 (which were closed in step 3 when the tank cover was mechanically locked tight), and through wire 257, to one side of the coil C; thence through wire 251 and fuse 249 to line L2. The consequent energization of coil C causes its associated latch 79 to mechanically lock with the cover catch 78 (thereby electrically locking the tank cover 41 closed), and simultaneously causes its associated normally-open contacts C1 to close, which in turn completes another electric circuit from wire 250, through the normally-closed contacts T1', wire 258, the said contacts R3, wire 259, the said contacts C1, and through wire 260 to one side of the starter coil S and run pilot RP; thence through wire 261, the normally-closed overload contacts OL', wire 251, and through fuse 249 to line L2. The consequent energization of coil S causes all of its associated contacts S1, S2, S4 and S5 to close, and S3 to open. The lighting of pilot RP indicates that the machine is in normal running operation. The closing of the normally-open contacts S1 and S2 completes a parallel control circuit to the coil S and pilot RP, from wire 250, through the said contacts R2, wire 256, the said contacts S2, wire 262, the said contacts S1, and through wire 260 to the said coil S and pilot RP. Another parallel control circuit is simultaneously completed from the said wire 262, through the bottom normally-closed contacts of the stop button 114, and through wire 263 to one side of the timer motor T; thence through wire 251 and fuse 249 to line L2, thereby causing the said motor T to operate. The closing of normally-open contacts S4 and S5 completes a power circuit from wire 250, through the said contacts S4, wire 264, the overload heater element OL, and wire 265 to one side of the motor 49; thence through wire 266, the said contacts S5, the wire 251 and fuse 249 to line L2, which causes the said motor and its associated pump parts to operate. A parallel power circuit is also completed from the said contacts S4, through wire 264 to the two immersion heater elements H1 and H2 connected in series, thence through wire 267, the normally-closed contacts A1, and through wire 266 to the said contacts S5, which causes the energization of the said elements H1 and H2. Another parallel power circuit is simultaneously completed from the said contacts S4, through wire 264, the normally-closed contacts A3 and wire 268 to the two immersion heater elements H1 and H2 connected in series, thence through wire 266 to the said contacts S5, which causes the energization of the said elements H3 and H4. These completed power circuits to the four said immersion heater elements H1, H2, H3 and H4, thereby connects them in series-parallel operation, which provides the maximum kilowatt output designed to bring the washing and rinsing water up to a possible maximum temperature of approximately 240 deg. F. by the end of either the "washing cycle" or "rinsing cycle," although the actual maximum temperature will be automatically maintained at 170 deg. F. by means of the high temperature thermostat HT. As previously explained, the contacts of HT remain open below 168 deg. F. and close above 170 deg. F. If the temperature of the water rises above 170 deg. F. a control circuit will be completed from wire 250, through the closed contacts HT, and through wire 269 to one side of the heater contactor coil A; thence through wire 266 to the previously closed contacts S5, wire 251 and fuse 249 to the line L2, thereby energizing the said coil A and causing its associated double-throw contacts A1 to open and A2 to close, and A3 to open and A4 to close. This action completes an electric power circuit from the previously closed contacts S4, through wire 264, through the two immersion heater elements H1 and H2 connected in series, through wire 267, the closed contacts A2 and A4 connected in series, wire 268, through the two immersion heater elements H3 and H4 connected in series, and through the wire 266 to the previously closed contacts S5, thereby energizing the four said elements in series operation, which provides the minimum kilowatt output designed to produce a maximum possible temperature of 120 deg. F. The temperature of the water accordingly drops until it reaches 168 deg. F., after which the contacts HT open, thereby breaking the said control circuit to the said coil A, which causes its associated double-throw contacts to actuate to normal position, opening A2 and A4 and closing A1 and A3, to thus return the four said elements to series-parallel operation and thereby raise the water temperature again to 170 deg. F., which would cause the contacts HT to close again. This method of control would continue to function during each cycle of the machine operation in which water is entering or circulating in the machine. The opening of the normally-closed contact S3 prevents another completion of the control circuit to the start relay coil R, through pressure of the start button 113 at any time after the preceding step 4 takes place, to prevent any interference with the complete automatic operation purposes of this invention. Referring to Fig. 39, two seconds after the start button 113 is pressed and the timer motor T begins to operate all of its associated contacts, the double-throw contacts T1' open and T1 close. The opening of contacts T1' does not effect the energization of the starter coil S, inasmuch as it is held energized through the said parallel control circuit from wire 250, through contacts R2, S2 and S1. The closing of contacts T1 completes still another parallel control circuit to the coil S and associated pilot RP, from wire 250, through the said contact T1, wire 263, the bottom normally-closed contacts of the stop button 114, and through the wire 262 and said contacts S1. Two seconds after the said actuation of the contacts T1' and T1, the normally-closed contacts T2 open, thereby breaking the holding circuit to the coil R and associated pilot SP from wire 250, through the said contacts T2, wire 254, the upper normally-closed contacts of the stop button 114, wire 255, the said contacts R1, and through wire 253 to the coil R and pilot SP, which action de-energizes the said coil R and pilot SP and causes the associated contacts R1, R2 and R3 to open. The opening of contacts R2 and R3 causes no changes in the previously described completed circuits which originally energized the electric cover lock coil C, the starter coil S and run pilot RP, inasmuch as these two coils and pilot are held energized by means of the following parallel control circuits: from wire 250, through contacts T1, wire 263, the bottom normally-closed contacts of the stop button 114, wire 262, thence through contacts S1 and wire 260 to the coil S and pilot RP, and through contacts S2, wire 256, the closed contacts 105, 104, and 106 of the mechanical latch, and wire 257 to the said coil C. Another parallel control circuit from contacts T1 is completed through wire 263 to hold the timer motor T energized and operating for the balance of the time period of the operation of the machine.

6. At the beginning of the first "water cycle," four seconds after the start button 113 is pressed, the normally-open timer contacts T3 close, thereby completing a parallel power electric circuit from the previously closed contacts S4, through wire 264, the said contacts T3, and through wire 270 to one side of the water solenoid coil W, thence through wire 266 to the previously closed contacts S5, thereby energizing the said coil W; which electrically operates the water valve 54 to open position to allow flow of water into the machine. At the end of the "water cycle," 30 seconds later, the said contacts T3 open, thereby breaking the circuit to the said coil W and thus operating the said water valve 54 to closed position to stop the flow of water.

7. Thirty-four seconds after the start button 113 is pressed, and simultaneously with the opening of the said contacts T3, the normally-closed timer contacts T2 which had previously opened after four seconds, again close. At the same time, the "washing cycle" begins and functions for a period of 9 minutes, 26 seconds.

8. The first "waste cycle" begins simultaneously with the end of the "washing cycle," or ten minutes after the start button 113 is pressed, at which time the normally-open timer contacts T4 close, thereby completing a power electric circuit from wire 250, through the said contacts T4, and wire 271 to one side of the waste solenoid coil WA; thence through wire 251 and fuse 249 to the line L2, thereby energizing the said coil WA, which electrically operates the waste valve 53 to open position to allow all the washing water to drain out of the machine. At the end of this "waste cycle," one minute later, the said contacts T4 open, thereby breaking the control circuit to the said solenoid WA and thus operating the said waste valve 53 to closed position, at which time the washing water is estimated to be completely drained from the machine. Simultaneously with the above described closing of contacts T4, the normally-open contacts T5 also close, which completes an electric control circuit from wire 250, through the said contacts T5, wire 272, the closed contacts of the low temperature thermostat LT (which are assumed to be closed due to the temperature in the machine after the "washing cycle" being above 142 deg. F.), and through the wire 269 to one side of the heater contactor coil A; thence through wire 266, the previously closed contacts S5, wire 251 and fuse 249 to the line L2, thereby energizing the said coil A and causing its associated double-throw contacts A1 to open and A2 to close, and A3 to open and A4 to close. This action completes an electric power circuit from the previously closed contacts S4, through wire 264, through the two immersion heater elements H1 and H2 connected in series, through wire 267, the closed contacts A2 and A4 connected in series, wire 268, through the two immersion heater elements H3 and H4 connected in series, and through the wire 266 to the previously closed contacts S5, thereby energizing the four said elements in series operation, which provides the minimum kilowatt output designed to produce a maximum air temperature of approximately 120 deg. F. This series operation of the said four elements accordingly reduces the heating temperature during the "waste cycle" in order to protect the said elements during the removal of the water from the machine. The thermostat LT however prevents this temperature from falling below 140 deg. F. inasmuch as the contacts LT automatically open below 140 deg. F. and by so doing breaks the control circuit to coil A, which thereby actuates its associated contacts to return the said four elements to their normal series-parallel circuit in which condition they produce their maximum temperature, until the temperature in the machine reaches 142 deg. F. at which point the contacts LT close again and complete the circuit to coil A again, and continue to function in this manner as long as the said contacts T5 are closed. The temperature in the machine during the "waste cycle" is thus automatically maintained between 140 deg. F. and 142 deg. F., and remains controlled in this manner until the said contacts T5 open at the beginning of the second "water cycle."

9. A time delay of 10 seconds is provided after the first "waste cycle" is completed, in order to assure the complete drainage of the washing water from the machine before fresh water enters the machine during the second "water cycle."

10. The second "water cycle" begins 11 minutes and 10 seconds after the start button 113 is pressed, at which time the normally-open timer contacts T3 again close to function in the same manner as previously described above in step 6 for the first "water cycle."

11. The "rinsing cycle" begins 11 minutes and 40 seconds after the start button 113 is pressed, and functions for a period of 5 minutes, 20 seconds. The water which entered the machine during the second "water cycle" is circulated and simultaneously heated to the predetermined temperature of 170 deg. F. as previously explained, during the first 2 minutes, 20 seconds, thereby rinsing the washing water from the dishes and tableware in the basket. During this time both the water valve 54 and waste valve 53 remain closed. At the end of this time, or 14 minutes after the start button 113 is pressed, the normally-open timer contacts T4 close, thereby energizing the waste solenoid WA, which electrically operates the waste valve 53 to open position to allow the said rinsing water to drain out of the machine. Simultaneously with the closing of the said contacts T4, the normally-open contacts T3 also close, thereby energizing the water solenoid W, which electrically operates the water valve 54 to open position to allow fresh rinsing water to again enter the machine, while the rinsed washing water is draining out of the open waste valve 53. The water valve 54 and waste valve 53 both remain open for the remaining 3 minutes of the "rinsing cycle," thereby allowing a continuous flow of fresh rinsing water to enter the machine, which is circulated and heated to the predetermined temperature of 170 deg. F., and continuously drains out through the open waste valve 53. It will therefore be seen that the "rinsing cycle" actually has two functions: (1) fresh water enters the machine, is heated and circulated through the machine to rinse the washing water from the dishes and tableware, and (2) fresh rinsing water is again injected into the machine in a continuous flow, is similarly heated and circulated through the machine, and continuously drains out of the machine until the end of the "rinsing cycle."

12. The second "waste cycle" begins simultaneously with the end of the "rinsing cycle," or 17 minutes after the start button 113 is pressed, at which time the normally-open timer contacts T3 open, thereby deenergizing the water solenoid W, which operates the water valve 54 to closed position and stops the flow of rinsing water into the machine. The normally-open contacts T4, which had closed during the previous "rinsing cycle" to thereby open the waste valve 53, remain closed, and keep the said waste valve open during this second "waste cycle," after which contacts T4 remain open. The contacts T5 close at the beginning of this "waste cycle," and remain closed until the end of the following "drying cycle," and function as explained in step 8 inasmuch as no more water will be used in the machine.

13. Eighteen minutes after the start button 113 is pressed, and simultaneously with the end of the second "waste cycle," the "drying cycle" begins and functions for a period of 2 minutes.

14. One second before the end of the "drying cycle," the double-throw timer contacts T1 open and T1' close; and as these particular contacts control the operation of the timer motor T, as well as the energization of starter coil S, run pilot RP, and cover lock C, the opening of the said contacts T1 breaks the holding control circuits to the said motor T, said coils S and C, and said pilot RP, thereby causing them to become de-energized. Therefore all the associated contacts of the timer, and the associated contacts of the starter and cover lock, are returned to their original normally de-energized positions, as shown in Fig. 38, and as indicated in the first vertical column of the cycle timing schedule in Fig. 39 in reference to the timer contacts. The de-energizing of the run pilot RP thus indicates that the machine operation is completed.

While the above detail description covers the automatic functioning of the various parts of the complete electric control equipment during a single complete operation of the machine, this described novel combination of automatic electrical means includes other means to further accomplish the principal object of this invention.

An important part of this object is to provide automatic means to accomplish recycling again of another complete operation of the machine, in the event that something unconventional occurs during the first or original operation after the start button 113 has been pressed as in step 4. Such an occurrence might be an overload of the motor 49, which would cause the thermal heater element OL to actuate and cause its associated normally-closed contacts OL' to open, thereby breaking the control circuit to the starter coil S and cover lock C, which would in turn stop the operation of the machine, and unlock the electrical cover lock. This said occurrence could be caused by a displacement of one or more parts of the contents of the dish basket assembly so that the same would jam between the rotating basket assembly and other stationary parts of the machine, thereby causing an overload condition on the motor 49. This said occurrence could also be caused by excessive friction in one or more of the bearings of the water pump or its associated basket impeller parts; or an excessive friction due to the water pump packing nut 131 and packing 130 becoming too tight; all of which would cause an overload condition on the motor 49. After the occurrence of such an overload condition and the consequent stoppage of the operation of the machine, the tank cover 41 could be mechanically unlocked and opened, for an investigation of the first mentioned possible occurrence. If the basket assembly were found to be jammed, the jammed object could be replaced in proper position or entirely removed, after which the tank cover 41 could be again mechanically locked tight (as in step 3), and then the start button could then be momentarily pressed (as in step 4). If the overload condition is otherwise caused by mechanical faults in the machine parts, which is unlikely to occur due to the careful design and construction of the machine, it would be advisable to obtain a qualified service mechanic to investigate and repair the fault. However, if the said overload condition had occurred at any time after the original "start cycle" had been completed, in which time the timer contact T1 had already closed to start the operation of the timer motor T, the said motor would continue to operate, due to the completed circuit from the closed contact T1, through wire 263 to the motor T; although circuits to coils S and C would be broken by the opening of contacts S1 and S2, respectively. Then the re-cycling of the balance of steps 5 to 14 would not take place until the actuating timer motor T had completed its normal operating cycle of 20 minutes, and its associated controlling contacts T1' had again closed. During this operating cycle of 20 minutes, the only electrical device which could possibly operate would be the waste valve 53, inasmuch as the electric power circuit to the coil WA is completed directly from the wire 250 and contacts T4, and all other power circuits operable by the starter through its associated contacts S4 and S5 are inoperable, due to the de-energization of the coil S. Therefore, the waste valve 53 will function two times during the said 20 minute cycle, to assure the complete drainage of all water from the machine, and the timer would be assured of returning to its normal starting position before re-cycling could take place again. As soon as the timer has returned to its normal starting position, the re-cycling of the balance of steps 5 to 14 would automatically take place.

Of course, the above described automatic means to re-cycle the operation of the machine would also function, if for any reason the stop button 114 was momentarily pressed to stop the operation of the machine. The obvious purpose of the preceding control means, and the previously described step by step normal control means, is to accomplish the principal object of providing complete automatic control of the machine whenever it is ready to be operated, that is, only one step is required (as in step 4)—momentarily press the start button 113—after which all operation of the machine is completely automatic.

I claim the following:

1. In a dish washing machine or the like, having automatic means to sequentially perform cycles of washing, rinsing and drying of dishes, tableware, pots, pans, or like objects, comprising a single wall tub, a watertight cover for said tub, a rotatable basket mounted within the said tub and designed to hold the said objects, an electric motor driven centrifugal pump means having its suction inlet arranged below and communicating with the bottom of the said tub, water and air circulating tubes extending from multiple discharge outlets of the said pump means to various discharge tubes inside the said tub, electrical heating means included within said discharge tubes, an electrically operated water inlet valve, an electrically operated water outlet valve, said centrifugal pump means being adapted to circulate water and air through said circulating and discharge tubes and including hydraulically actuated rotatable vanes, a hydraulic coupling means adapted to rotate said basket and including primary vanes, attached to and rotatable by the said pump vanes, and secondary vanes attached to said basket and hydraulically rotated by its associated primary vanes, said pump when rotated and circulating water hydraulically imparting rotation to its said included vanes and said clutch primary vanes simultaneously, and said primary vanes hydraulically acting upon and rotating its associated said secondary vanes and the said basket attached thereto.

2. In a dish washing machine or the like, having automatic means to sequentially perform cycles of washing, rinsing and drying of dishes, tableware, pots, pans, or like objects, comprising a single wall tub, a watertight cover for said tub, a rotatable basket mounted within the said tub and designed to hold the said objects, an electric motor driven centrifugal pump means having its suction inlet arranged below and communicating with the bottom of the said tub, water and air circulating tubes extending from multiple discharge outlets of the said pump means to various discharge tubes inside the said tub, electrical heating means included within said discharge tubes, an electrically operated water inlet valve, an electrically operated water outlet valve, said centrifugal pump means being adapted to circulate water and air through said circulating and discharge tubes and including hydraulically operated means to hydraulically rotate the said basket, said electrical heating means being readily removable from said discharge tubes, and said discharge tubes having threadless tapered compression attaching means adaptable for easy and quick removal of the said discharge tubes from the machine for purpose of cleansing, and their subsequent positive replacement in the machine.

3. In a dishwashing machine as claimed in claim 1, said automatic means including a manually operable start switch and stop switch, an electrically operated cycle starting relay, an electrically operated starter having means to control the machine operation, an electrically operated lock for the said tub cover, an interlocking switch operable when said tub cover is closed to consequently complete an electrical circuit to said cover lock, electrical heating elements included in the said electrical heating means, an electrically operated contactor having means to control said heating elements, a high thermostat switch operable to control water at a predetermined higher temperature, a low thermostat switch operable to control air at a predetermined lower temperature, and an electrically operated timer having a motor and cam-operated switch means functional to electrically control the said cycles of machine operation, said automatic means being electrically interconnected and functional to start the machine operation subsequent to the manual actuation of said start switch, and consequently energizing said relay and said lock when said interlocking switch is closed by said tub cover in closed position, said lock when energized being functional to consequently energize said starter which consequently energizes its associated pump motor and the said heating elements, and simultaneously energizes said timer motor which consequently actuates its associated switch means to effect operation of said water inlet valve, said water outlet valve, said pump motor, and said heating elements being in a predetermined sequence to effect predetermined time periods for the washing, rinsing and drying cycles of the machine operation, at termination of which said electrical equipment becomes deenergized.

4. In a dish washing machine as claimed in claim 3, said contactor when deenergized having means to electrically connect the said heating elements in series-parallel manner, said contactor when energized having means to electrically connect said heating elements in series manner, said high thermostat switch being electrically connected and operable to deenergize said contactor subsequent to attainment of a predetermined high temperature to the water during the washing and rinsing cycles of the machine operation and operable to energize said contactor when predetermined high water temperature is attained, said low thermostat switch being electrically interconnected with said cam-operated switch means of said timer and operable to deenergize said contactor subsequent to attainment of a predetermined high temperature to the air during the drying cycle of the machine operation and operable to energize said contactor when predetermined high air temperature is attained.

5. In a dish washing machine as claimed in claim 3, said automatic means being electrically interconnected and functional to stop operation of the machine at any time during any sequential cycle upon manual actuation of said stop switch and subsequently deenergizing said relay and said starter to consequently deenergize all electrical equipment except said timer motor which continues to normally operate its associated said cam-operated switch means until completion of the predetermined time period of the drying cycle, said automatic means also being functional to automatically preset the start of the sequential cycles of a consequent machine operation, subsequent to the manual actuation of said start switch at any time before termination of the predetermined time period of the drying cycle of the machine operation.

6. In a dish washing machine as claimed in claim 3, including normal starting means to start said cycles of machine operation operable by a single momentary manual actuation of said start switch, including stopping means to stop the machine operation during any sequential cycle of the machine operable by a single momentary manual actuation of said stop switch, and including automatic recycling means functional subsequently to an actuation of said stopping means preceding a single momentary manual actuation of said start switch, said recycling means being operable to properly prepare said automatic means for recycling of a consequent machine operation and functional simultaneously with the termination of the predetermined time period of the drying cycle actuated by the said timer motor and its associated said cam-operated switch means.

EDWIN F. WHEELER.

References Cited in the file of this patent

UNITED STATES PATENTS

| Number | Name | Date |
|---|---|---|
| 1,633,803 | Ballin | June 28, 1928 |
| 1,687,458 | Lancelot | Oct. 9, 1928 |
| 1,941,660 | Collins | Jan. 2, 1934 |
| 1,979,504 | Tafel | Nov. 6, 1934 |
| 2,142,928 | Walker | Jan. 3, 1939 |
| 2,151,354 | Osuch | Mar. 21, 1939 |
| 2,155,254 | Clark | Apr. 18, 1939 |
| 2,155,273 | Jones | Apr. 18, 1939 |
| 2,195,615 | Chamberlin | Apr. 2, 1940 |
| 2,197,178 | Gates | Apr. 16, 1940 |
| 2,278,268 | Kempton | Mar. 31, 1942 |
| 2,543,993 | Stanitz | Mar. 6, 1951 |